United States Patent
Kwak et al.

(10) Patent No.: US 11,564,219 B2
(45) Date of Patent: *Jan. 24, 2023

(54) METHOD AND APPARATUS FOR TRANSMITTING AND RECEIVING DOWNLINK CONTROL CHANNEL

(71) Applicant: LG Electronics Inc., Seoul (KR)

(72) Inventors: Kyuhwan Kwak, Seoul (KR); Inkwon Seo, Seoul (KR); Yunjung Yi, Seoul (KR); Hyunho Lee, Seoul (KR); Daesung Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 36 days.

This patent is subject to a terminal disclaimer.

(21) Appl. No.: 17/156,059

(22) Filed: Jan. 22, 2021

(65) Prior Publication Data

US 2021/0144689 A1 May 13, 2021

Related U.S. Application Data

(63) Continuation of application No. 16/529,117, filed on Aug. 1, 2019, now Pat. No. 10,912,073, which is a
(Continued)

(51) Int. Cl.
*H04W 72/04* (2009.01)
*H04L 5/00* (2006.01)
*H04L 1/00* (2006.01)

(52) U.S. Cl.
CPC ............ *H04W 72/042* (2013.01); *H04L 1/00* (2013.01); *H04L 5/00* (2013.01); *H04L 5/0007* (2013.01); *H04L 5/0048* (2013.01)

(58) Field of Classification Search
None
See application file for complete search history.

(56) References Cited

U.S. PATENT DOCUMENTS 10,097,327 B2  10/2018 Park et al.
10,609,693 B2   3/2020 Park et al.
(Continued)

FOREIGN PATENT DOCUMENTS

JP      2016146630      8/2016
KR     1020120103619    9/2012
(Continued)

OTHER PUBLICATIONS

Huawei, HiSilicon, "Discussion on NR-PDCCH structure," R1-1704204, 3GPP TSG RAN WG1 Meeting #88bis, Spokane, USA, dated Apr. 3-7, 2017, 4 pages.
(Continued)

*Primary Examiner* — Rebecca E Song
(74) *Attorney, Agent, or Firm* — Fish & Richardson P.C.

(57) ABSTRACT

A method of receiving a downlink control channel at a user equipment (UE) in a wireless communication system is disclosed. The method includes receiving information on a resource element group (REG) bundle size and information on a size of a matrix for interleaving a plurality of REGs configuring at least one control channel element (CCE) through a higher layer, determining the matrix for interleaving the plurality of REGs based on the information on the size of the matrix and the information on the REG bundle size, interleaving the plurality of REGs bundled into one or more REG bundles according to the REG bundle size using the matrix, and receiving the downlink control channel based on the plurality of interleaved REGs.

9 Claims, 29 Drawing Sheets

Related U.S. Application Data continuation of application No. 16/065,561, filed as application No. PCT/KR2018/004921 on Apr. 27, 2018, now Pat. No. 10,455,573.

(60) Provisional application No. 62/521,323, filed on Jun. 16, 2017, provisional application No. 62/505,852, filed on May 13, 2017, provisional application No. 62/491,927, filed on Apr. 28, 2017.

(56) References Cited

U.S. PATENT DOCUMENTS

| | | | |
|---|---|---|---|
| 2010/0118800 A1 | 5/2010 | Kim et al. | |
| 2012/0063350 A1 | 3/2012 | Kim et al. | |
| 2015/0092718 A1 | 4/2015 | Roh et al. | |
| 2015/0146669 A1 | 5/2015 | Tang et al. | |
| 2016/0119083 A1 | 4/2016 | Zhao et al. | |
| 2018/0083736 A1* | 3/2018 | Manolakos | H04L 5/0007 |
| 2018/0227156 A1 | 8/2018 | Papasakellariou | |
| 2018/0279135 A1 | 9/2018 | Hwang et al. | |
| 2018/0288749 A1 | 10/2018 | Sun et al. | |
| 2019/0253308 A1 | 8/2019 | Huang et al. | |
| 2019/0297607 A1 | 9/2019 | Kim et al. | |
| 2019/0306700 A1 | 10/2019 | Lin | |
| 2019/0342907 A1 | 11/2019 | Huang et al. | |
| 2020/0068540 A1 | 2/2020 | Wang et al. | |
| 2020/0076559 A1 | 3/2020 | Yoshimura et al. | |
| 2020/0092813 A1 | 3/2020 | Kim et al. | |
| 2020/0092946 A1 | 3/2020 | Xiong et al. | |
| 2020/0100220 A1 | 3/2020 | Takeda et al. | |
| 2020/0305134 A1 | 9/2020 | Noh et al. | |
| 2020/0374844 A1 | 11/2020 | Takeda et al. | |
| 2020/0374967 A1 | 11/2020 | Nogami et al. | |
| 2021/0058113 A1 | 2/2021 | Jung et al. | |

FOREIGN PATENT DOCUMENTS

| | | |
|---|---|---|
| KR | 1020130075716 | 7/2013 |
| KR | 1020150013705 | 2/2015 |
| KR | 1020150039813 | 4/2015 |
| RU | 2583043 | 5/2016 |
| WO | WO2011093671 | 8/2011 |
| WO | WO2013100623 | 7/2013 |
| WO | WO-2017193396 A1 * | 11/2017 |
| WO | WO2018144852 | 8/2018 |

OTHER PUBLICATIONS

Office Action in Chinese Appln. No. 201880016807.0, dated Jul. 5, 2021, 14 pages (with English translation).
Office Action in U.S. Appl. No. 17/206,898, dated Jun. 14, 2021, 13 pages.
ID Office Action in Indonesian Appln. No. PID201900537, dated Jan. 21, 2021, 4 pages (with English translation).
Ericsson, "WF on REG to CCE Mapping for NR-PDCCH," R1-1706318, 33GP TSG RAN1 Meeting#88bis, Spokane, USA, dated Apr. 3-7, 2017, 3 pages, XP051252491.
Etri, "Discussion on NR-PDCCH structure," R1-1702348, 3GPP TSG RAN WG1 #88, Athens, Greece, Feb. 13-17, 2017, 4 pages.
Examination Report in Australia Patent Application No. 2018257256, dated Oct. 22, 2019, 5 pages.
Extended European Search Report in European Application No. 18790941.1 dated Jan. 24, 2020, 9 pages.
Huawei, HiSilicon, "Discussion on NR-PDCCH structure," R1-1704204, 3GPP TSG RAN WG1 Meeting #88bis, Spokane, USA, Apr. 3-7, 2017, 4 pages.
Huawei, HiSilicon, "Search space design considerations," R1-1704202, 3GPP TSG RAN WG1 Meeting #88bis, Spokane, USA, Apr. 3-7, 2017, 4 pages.
Japanese Office Action in Japanese Application No. 2018-568953, dated Jan. 28, 2020, 5 pages (with English translation).
NTT Docomo, Inc., "Views on NR-PDCCH structure," R1-1702808, 3GPP TSG RAN WG1 Meeting #88, Athens, Greece, dated Feb. 13-17, 2017, 6 pages.
Panasonic et al., "WF on NR-PDCCH structure", Apr. 3-7, 2017, 3GPP TSG RAN WG1 RAN#88bis (Year: 2017).
Panasonic, "Configuration of CORSET and Search space design," R1-1705175, 3GPP TSG RAN WG1 Meeting #88bis, Spokane, USA, dated Apr. 3-7, 2017, 3 pages, XP051243306.
Russian Notice of Allowance in Russian Application No. 2019110421, dated Mar. 24, 2020, 22 pages (with English translation).

* cited by examiner

FIG. 1
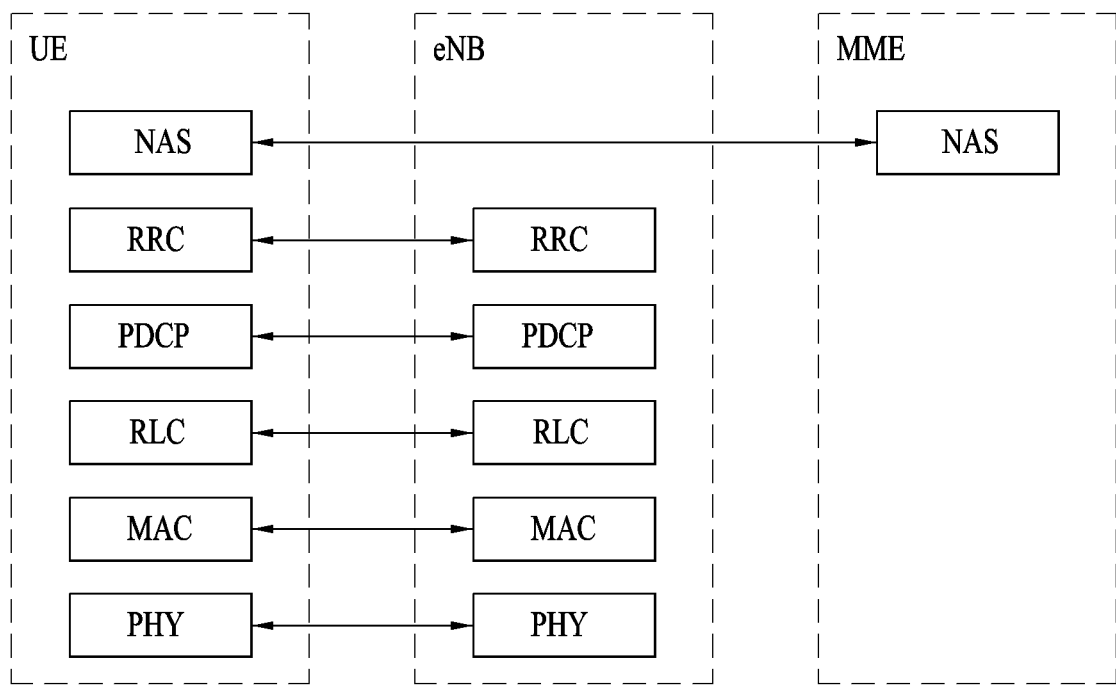
(A) CONTROL-PLANE PROTOCOL STACK
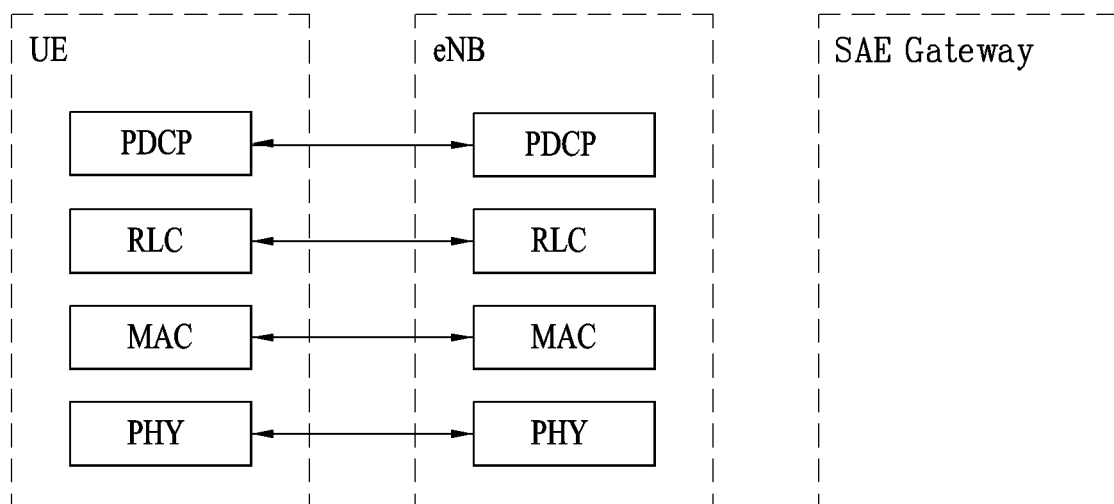
(B) USER-PLANE PROTOCOL STACK

FIG. 5
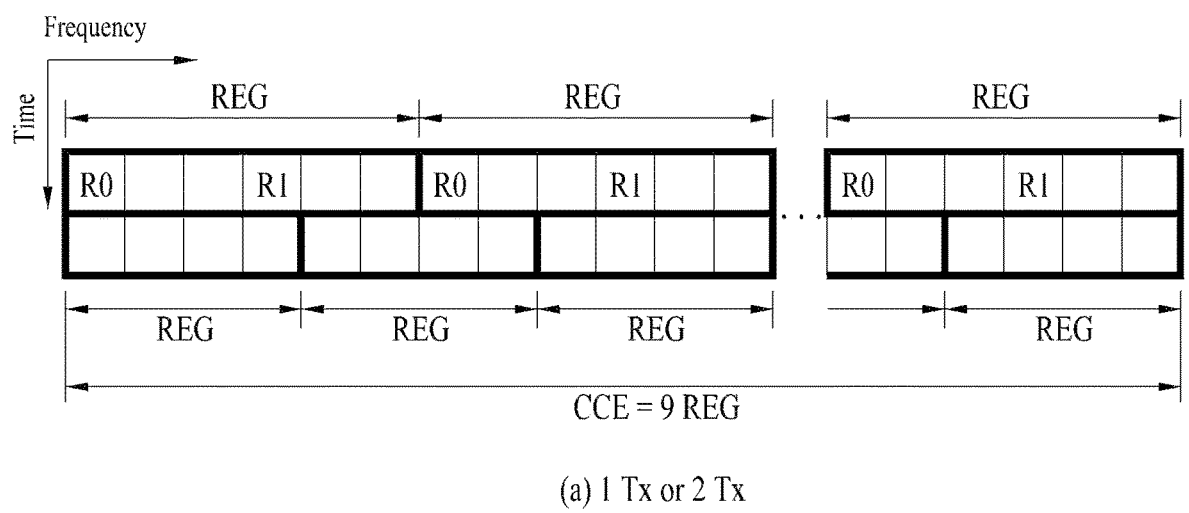
(a) 1 Tx or 2 Tx
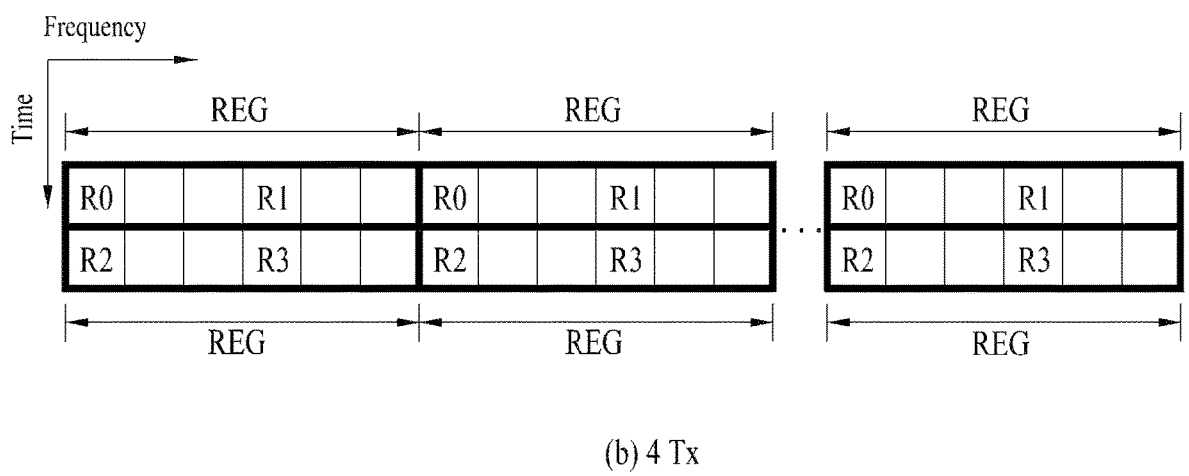
(b) 4 Tx

FIG. 8
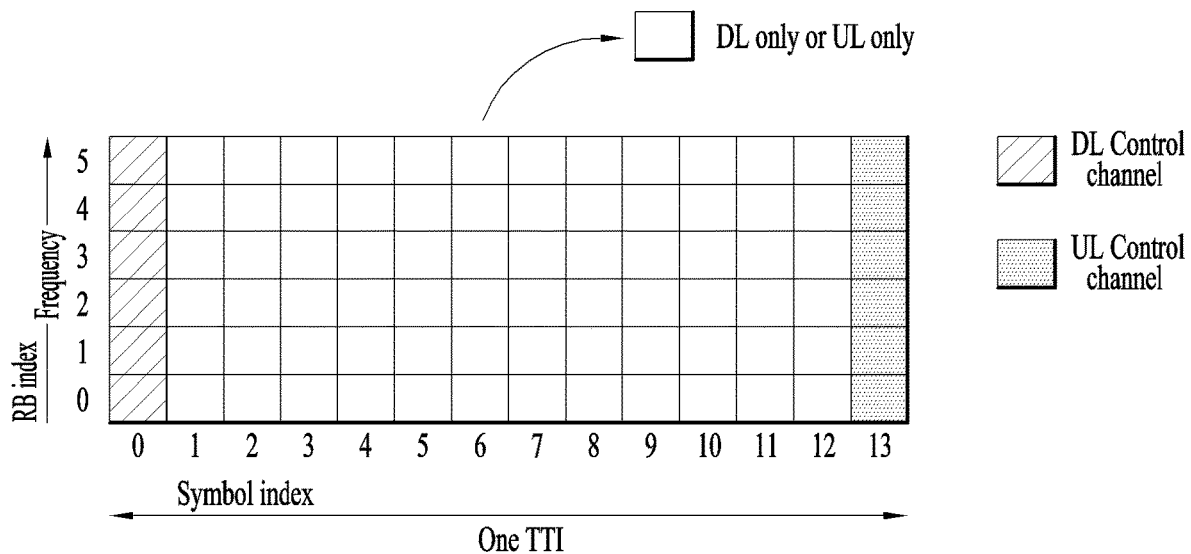
(a)
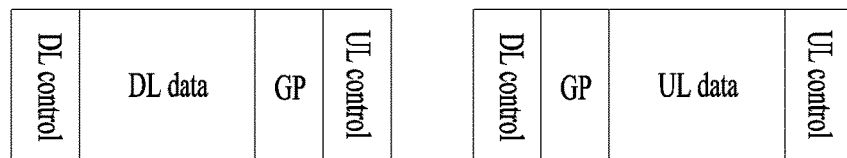
(b)

FIG. 9
| CORESET duration : 1 | CORESET duration : 2 | CORESET duration : 3 |
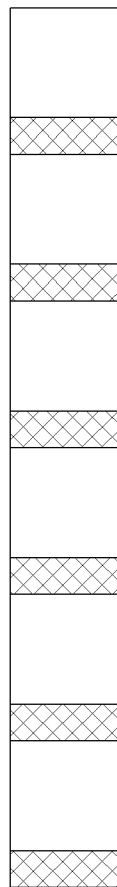 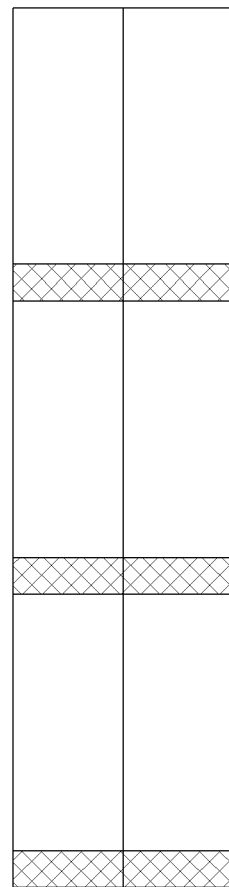 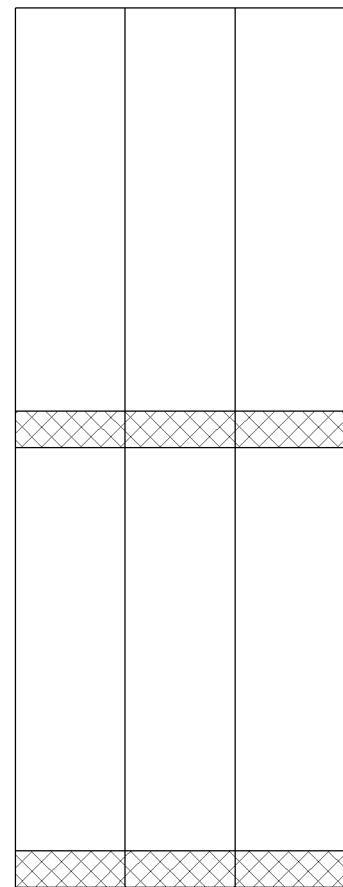
No bundling    Bundling size : 2    Bundling size : 3

FIG. 10
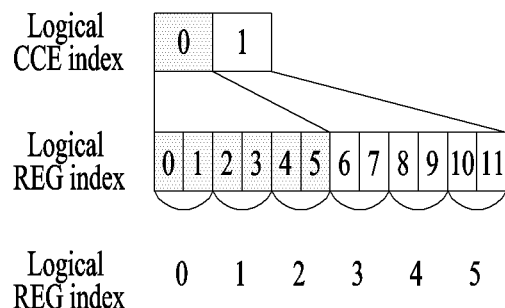
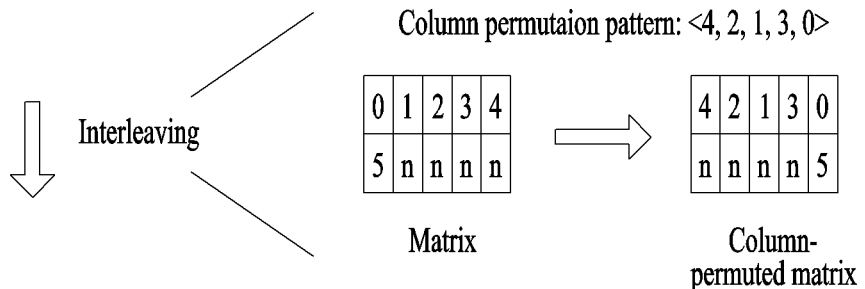
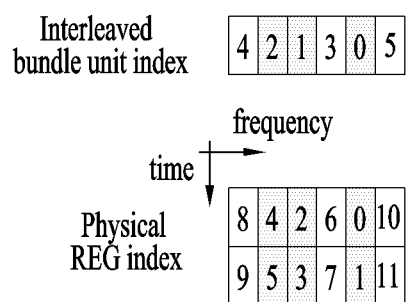

FIG. 11
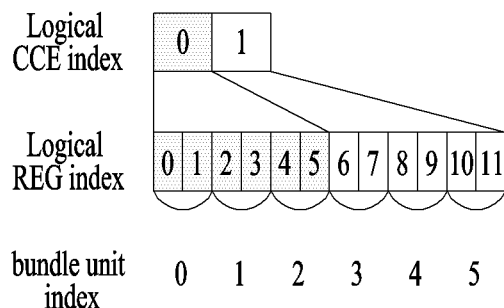
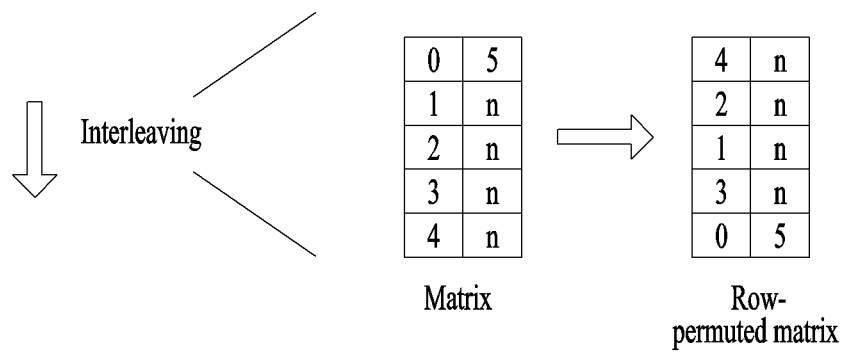
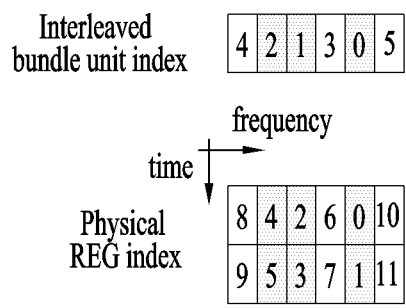

FIG. 14
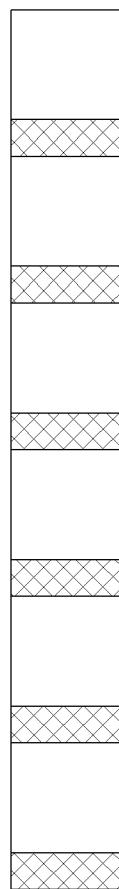 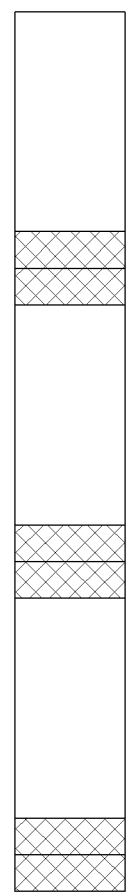 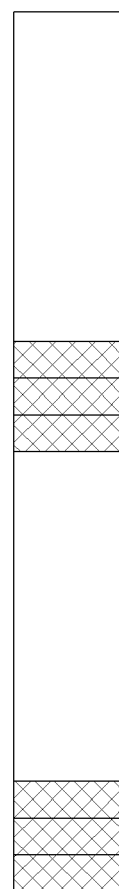
No bundling　　　　　Bundling size : 2　　　　　Bundling size : 3

FIG. 15
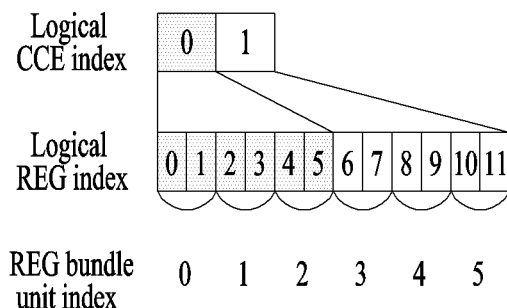
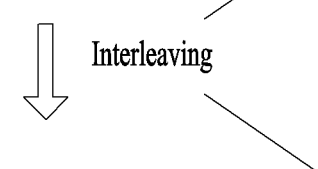 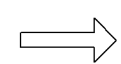
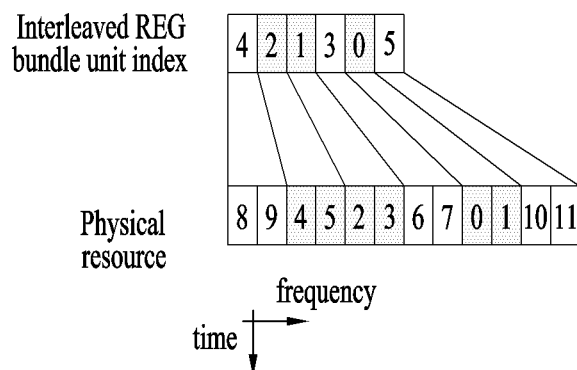

FIG. 16
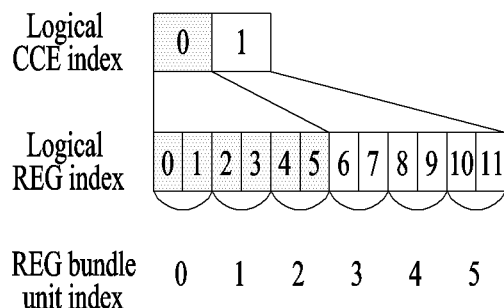
Row permutaion pattern: <4, 2, 1, 3, 0>
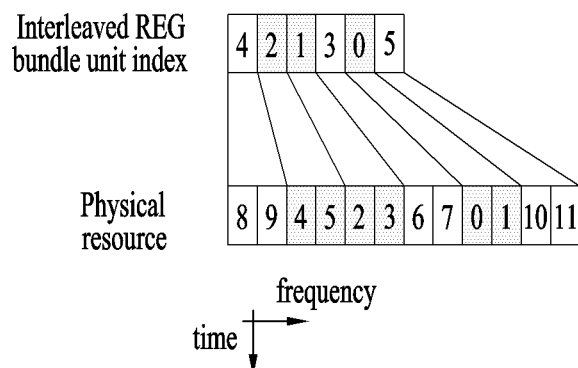

FIG. 18
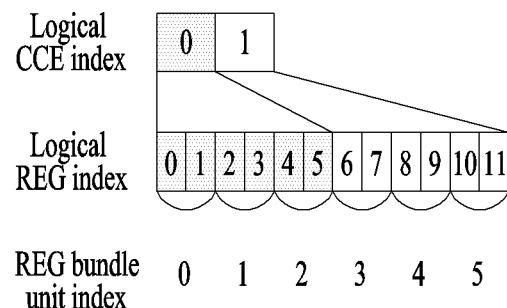
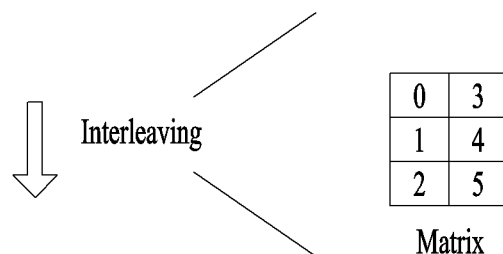
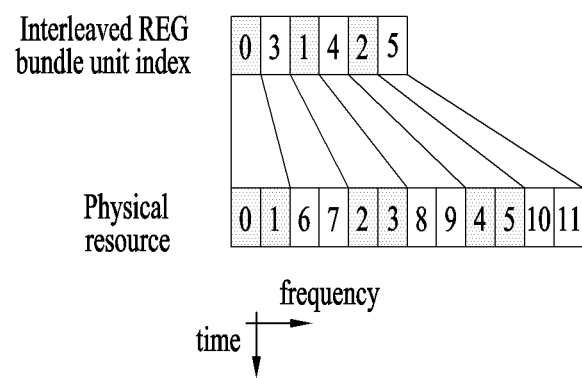

METHOD AND APPARATUS FOR TRANSMITTING AND RECEIVING DOWNLINK CONTROL CHANNEL

CROSS-REFERENCE TO RELATED APPLICATIONS

This application is a continuation of U.S. application Ser. No. 16/529,117, filed on Aug. 1, 2019, now allowed, which is a continuation of U.S. application Ser. No. 16/065,561, filed on Nov. 5, 2018, now U.S. Pat. No. 10,455,573, which is a National Stage application under 35 U.S.C. § 371 of International Application No. PCT/KR2018/004921, filed on Apr. 27, 2018, which claims the benefit of U.S. application Ser. No. 62/521,323, filed on Jun. 16, 2017, U.S. application Ser. No. 62/505,852, filed on May 13, 2017, and U.S. application Ser. No. 62/491,927, filed on Apr. 28, 2017. The disclosures of the prior applications are incorporated by reference in their entirety.

TECHNICAL FIELD

The present invention relates to a method and apparatus for receiving a downlink control channel and, more particularly, to a method and apparatus for receiving a plurality of resource element groups (REGs) included in a control channel element (CCE) configuring a downlink control channel in a state of being mapped to one or more physical resources.

BACKGROUND

As more and more communication apparatuses require more communication traffic, a next-generation 5G system, which is further improved as compared to an existing LTE system, is required. In the next-generation 5G system called NewRAT, communication scenarios are classified into Enhanced Mobile BroadBand (eMBB), Ultra-reliability and low-latency communication (URLLC), and Massive Machine-Type Communications (mMTC).

The eMBB is a next-generation mobile communication scenario having high spectrum efficiency, high user experienced data rate, high peak data rate, etc., the URLLC is a next-generation mobile communication scenario having ultra-high reliability, ultra-low latency, ultra-high availability, etc. (e.g., V2X, Emergency Service, Remote Control), and the mMTC is a next-generation mobile communication scenario having low cost, low energy, short packets, massive connectivity, etc. (e.g., IoT).

The present invention provides a method and apparatus for receiving a downlink control channel.

Technical tasks obtainable from the present invention are non-limited by the above-mentioned technical task. And, other unmentioned technical tasks can be clearly understood from the following description by those having ordinary skill in the technical field to which the present invention pertains.

The object of the present invention can be achieved by providing a method of receiving a downlink control channel at a user equipment (UE) in a wireless communication system including receiving information on a resource element group (REG) bundle size and information on a size of a matrix for interleaving a plurality of REGs configuring at least one control channel element (CCE) through a higher layer, determining the matrix for interleaving the plurality of REGs based on the information on the size of the matrix and the information on the REG bundle size, interleaving the plurality of REGs bundled into one or more REG bundles according to the REG bundle size using the matrix, and receiving the downlink control channel based on the plurality of interleaved REGs.

The plurality of REGs may be interleaved in units of one or more REG bundles.

The information on the size of the matrix may be information on a size of rows or columns of the matrix.

The size of the columns or rows of the matrix may be determined based on the size of the rows or columns of the matrix and the number of REG bundles included in a control resource set (CORESET) configured in the UE.

If the determined size of the columns or rows of the matrix is not an integer, an integer having a minimum value among integers greater than the determined size of the columns or rows of the matrix may be determined as the size of the columns or rows of the matrix.

If the number of the plurality of REGs included in each of the at least one CCE corresponds to a product of a value of the information on the size of the matrix and a value of the information on the REG bundle size, the one or more REG bundles may be mapped to physical resources at a regular interval.

If a value of the information on the size of the matrix is equal to the number of REG bundles included in each of the at least one CCE, the one or more REG bundles may be mapped to physical resources at a regular interval.

The received information on the REG bundle size may be determined based on the number of symbols of a control resource set (CORESET) configured in the UE.

In another aspect of the present invention, provided herein is a user equipment (UE) for receiving a downlink control channel in a wireless communication system including a radio frequency (RF) module for transmitting and receiving a radio signal to and from a base station, and a processor connected to the RF module and configured to receive information on a resource element group (REG) bundle size and information on a size of a matrix for interleaving a plurality of REGs configuring at least one control channel element (CCE) through a higher layer, to determine the matrix for interleaving the plurality of REGs based on the information on the size of the matrix and the information on the REG bundle size, to interleave the plurality of REGs bundled into one or more REG bundles according to the REG bundle size using the matrix, and to receive the downlink control channel based on the plurality of interleaved REGs.

The information on the size of the matrix may be information on a size of rows or columns of the matrix.

The size of the columns or rows of the matrix may be determined based on the size of the rows or columns of the matrix and the number of REG bundles included in a control resource set (CORESET) configured in the UE.

If the determined size of the columns or rows of the matrix is not an integer, an integer having a minimum value among integers greater than the determined size of the columns or rows of the matrix may be determined as the size of the columns or rows of the matrix.

If the number of the plurality of REGs included in each of the at least one CCE corresponds to a product of a value of the information on the size of the matrix and a value of the information on the REG bundle size, the one or more REG bundles may be mapped to physical resources at a regular interval.

If a value of the information on the size of the matrix is equal to the number of REG bundles included in each of the at least one CCE, the one or more REG bundles may be mapped to physical resources at a regular interval.

The received information on the REG bundle size may be determined based on the number of symbols of a control resource set (CORESET) configured in the UE.

According to the present invention, it is possible to increase diversity effect by dispersing CCEs configuring a downlink control channel on one or more physical resources.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

FIG. 1 is a diagram for structures of control and user planes of radio interface protocol between a 3GPP radio access network standard-based user equipment and E-UTRAN;

FIG. 5 illustrates resource units used to configure a downlink control channel in LTE;

FIG. 8 illustrates an example of a self-contained subframe structure;

FIG. 9 is a view showing an embodiment of bundling REGs on a time axis;

FIGS. 10 to 13 are views showing embodiments of dispersing REGs based on a time axis;

FIG. 14 is a view showing an embodiment of bundling REGs on a frequency axis;

FIGS. 15 to 18 are views showing embodiments of dispersing REGs based on a frequency axis;

DETAILED DESCRIPTION

Figure 2:
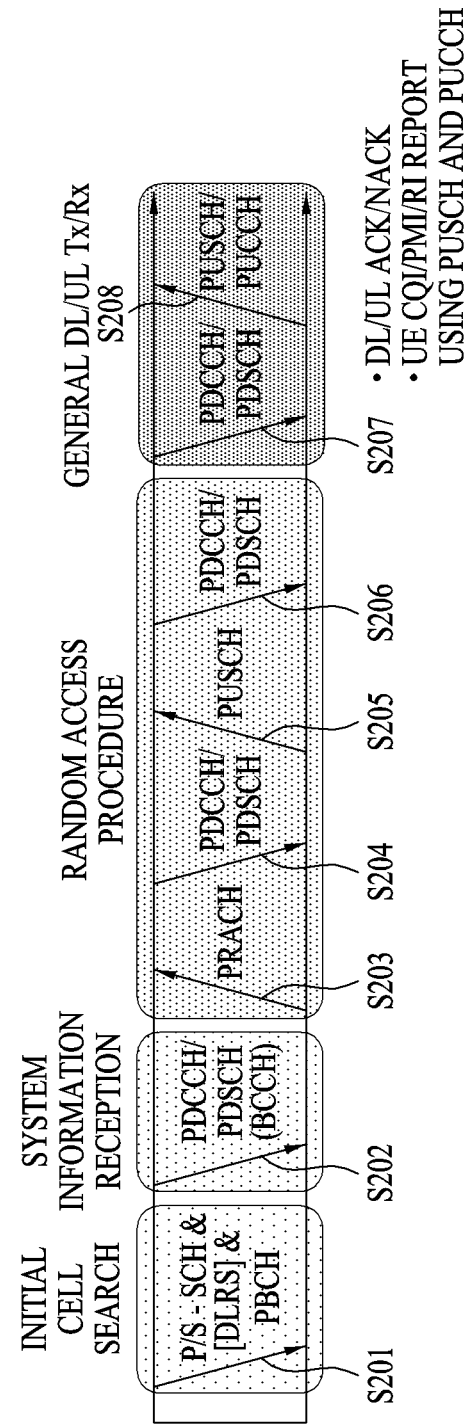
FIG. 2 is a diagram for explaining physical channels used for 3GPP system and a general signal transmission method using the physical channels.

The configuration, operation, and other features of the present disclosure will readily be understood with embodiments of the present disclosure described with reference to the attached drawings. Embodiments of the present disclosure as set forth herein are examples in which the technical features of the present disclosure are applied to a 3rd Generation Partnership Project (3GPP) system.

While embodiments of the present disclosure are described in the context of Long Term Evolution (LTE) and LTE-Advanced (LTE-A) systems, they are purely exemplary. Therefore, the embodiments of the present disclosure are applicable to any other communication system as long as the above definitions are valid for the communication system.

The term 'Base Station (BS)' may be used to cover the meanings of terms including Remote Radio Head (RRH), evolved Node B (eNB or eNode B), Reception Point (RP), relay, etc.

FIG. 1 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

FIG. 2 illustrates physical channels and a general method for transmitting signals on the physical channels in the 3GPP system.

Referring to FIG. 2, when a UE is powered on or enters a new cell, the UE performs initial cell search (S201). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a Physical Random Access Channel (PRACH) (S203 and S205) and may receive a response message to the preamble on a PDCCH and a PDSCH associated with the PDCCH (S204 and S206). In the case of a contention-based RACH, the UE may additionally perform a contention resolution procedure.

After the above procedure, the UE may receive a PDCCH and/or a PDSCH from the eNB (S207) and transmit a Physical Uplink Shared Channel (PUSCH) and/or a Physical Uplink Control Channel (PUCCH) to the eNB (S208), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 3:
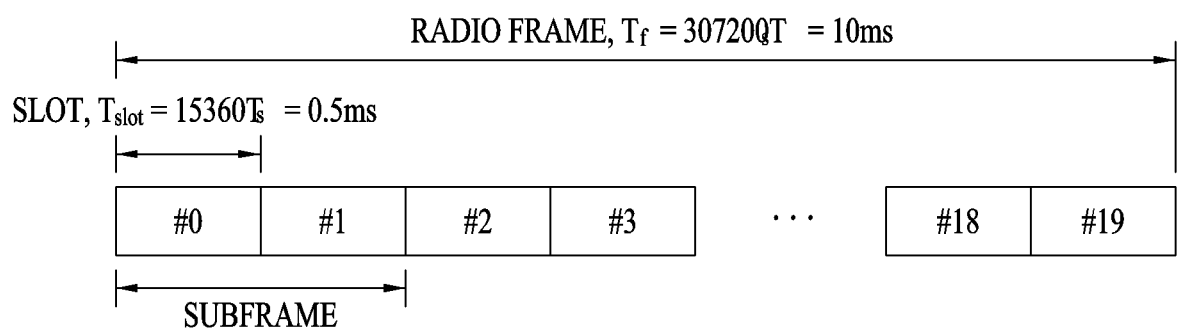
FIG. 3 is a diagram for a structure of a radio frame in LTE system.

FIG. 3 illustrates a structure of a radio frame used in the LTE system.

Referring to FIG. 3, a radio frame is 10 ms (327200×Ts) long and divided into 10 equal-sized subframes. Each subframe is 1 ms long and further divided into two slots. Each time slot is 0.5 ms (15360×Ts) long. Herein, Ts represents a sampling time and Ts=1/(15 kHz×2048)=3.2552×10−8 (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 4:
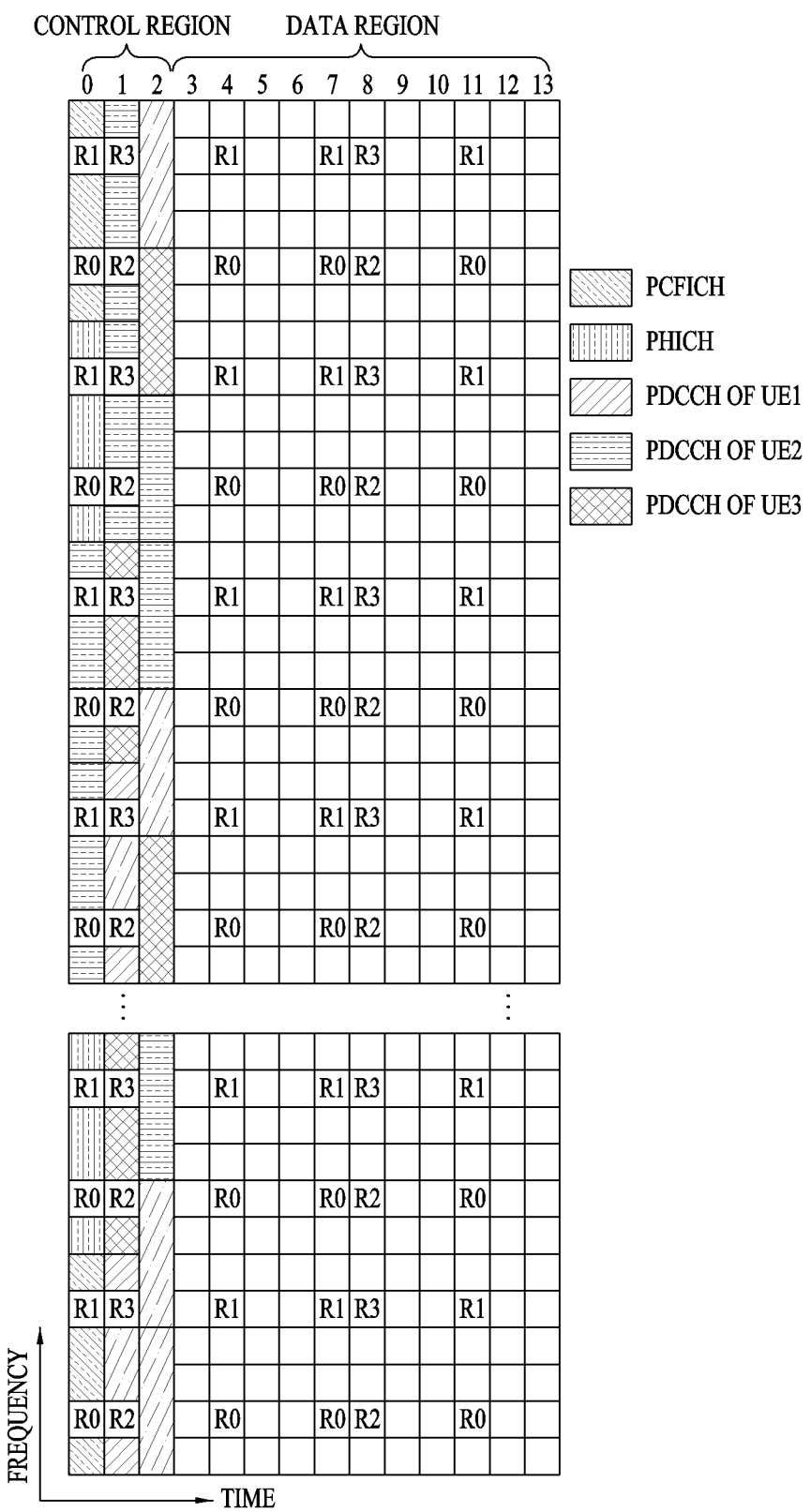
FIG. 4 illustrates a structure of a downlink radio frame in the LTE system.

FIG. 4 illustrates exemplary control channels included in a control region of a subframe in a DL radio frame.

Referring to FIG. 4, a subframe includes 14 OFDM symbols. The first one to three OFDM symbols of a subframe are used for a control region and the other 13 to 11 OFDM symbols are used for a data region according to a subframe configuration. In FIG. 4, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

FIG. 5 illustrates resource units used to configure a downlink control channel in LTE. FIG. 5(a) shows a case in which the number of transmit (Tx) antennas is 1 or 2 and FIG. 5(b) shows a case in which the number of Tx antenna is 4. Although a different RS pattern is used according to the number of Tx antennas, REs are configured for a DL control channel in the same manner.

Referring to FIG. 5, a basic resource unit of a DL control channel is an REG. The REG includes four contiguous REs except for REs carrying RSs. REGs are marked with bold lines in FIG. 5. A PCFICH and a PHICH include 4 REGs and 3 REGs, respectively. A PDCCH is configured in units of a control channel element (CCE), each CCE including 9 REGs.

To determine whether a PDCCH including L CCEs is transmitted to a UE, the UE is configured to monitor $M^{(L)}$ (≥L) CCEs that are arranged contiguously or according to a predetermined rule. L that the UE should consider for PDCCH reception may be a plural value. CCE sets that the UE should monitor to receive a PDCCH are referred to as a search space. For example, LTE defines search spaces as illustrated in Table 1.

TABLE 1

| Type | Search space $S_k^{(L)}$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

In Table 1, L is a CCE aggregation level, that is, the number of CCEs in a PDCCH, $S_k^{(L)}$ is a search space with CCE aggregation level L, and $M^{(L)}$ is the number of candidate PDCCHs to be monitored in the search space with CCE aggregation level L.

Search spaces are classified into a UE-specific search space accessible only by a specific UE and a common search space accessible by all UEs within a cell. A UE monitors common search spaces with CCE aggregation levels 4 and 8 and UE-specific search spaces with CCE aggregation levels 1, 2, 4, and 8. A common search space and a UE-specific search space may overlap each other.

For each CCE aggregation level, the position of the first CCE (a CCE having the smallest index) of a PDCCH search space allocated to a UE changes every subframe. This is called PDCCH search space hashing.

A CCE may be distributed across a system band. More specifically, a plurality of logically contiguous CCEs may be input to an interleaver and the interleaver may permute the sequence of the input CCEs on an REG basis. Accordingly, the time/frequency resources of one CCE are distributed physically across the total time/frequency region of the control region of a subframe. As a control channel is configured in units of a CCE but interleaved in units of an REG, frequency diversity gain and interference randomization gain may be maximized.

Figure 6:
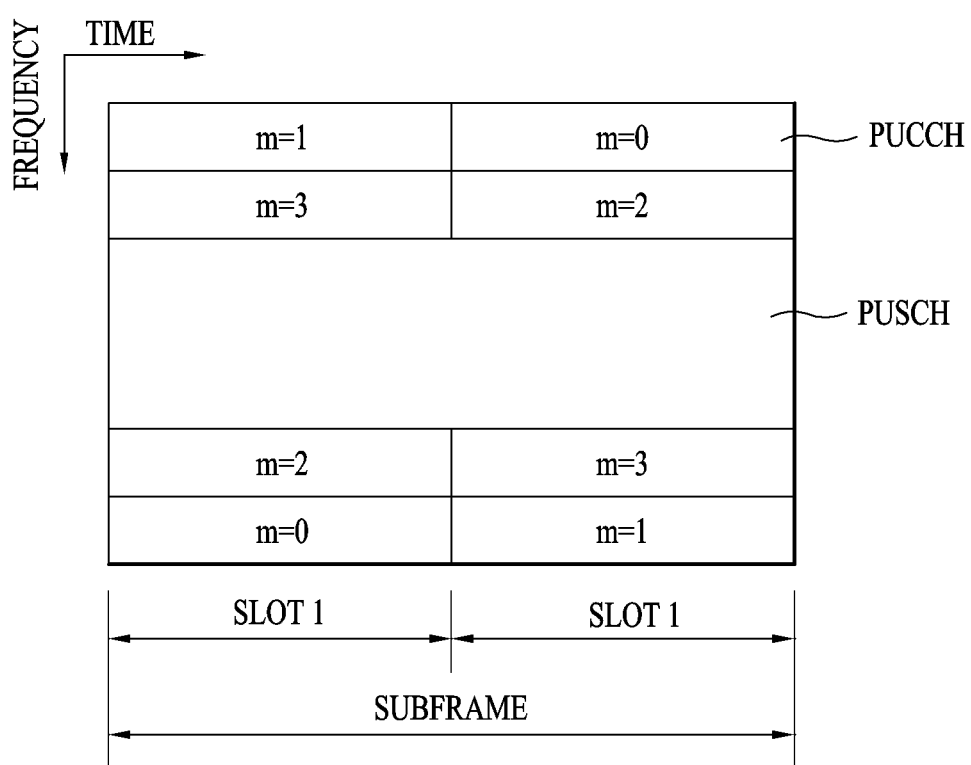
FIG. 6 illustrates a structure of an uplink subframe in the LTE system.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 6.

Hereinafter, channel state information (CSI) reporting will be described below. In the current LTE standard, there are two MIMO transmission schemes, open-loop MIMO operating without channel information and closed-loop MIMO operating with channel information. Particularly in the closed-loop MIMO, each of an eNB and a UE may perform beamforming based on CSI to obtain the multiplexing gain of MIMO antennas. To acquire CSI from the UE, the eNB may command the UE to feed back CSI on a downlink signal by allocating a PUCCH (Physical Uplink Control CHannel) or a PUSCH (Physical Uplink Shared CHannel) to the UE.

The CSI is largely classified into three information types, RI (Rank Indicator), PMI (Precoding Matrix), and CQI (Channel Quality Indication). First of all, the RI indicates rank information of a channel as described above, and means the number of streams that may be received by a UE through the same time-frequency resources. Also, since the RI is determined by long-term fading of a channel, the RI may be fed back to an eNB in a longer period than a PMI value and a CQI value.

Second, the PMI is a value obtained by reflecting spatial characteristics of a channel, and indicates a precoding matrix index of an eNB, which is preferred by the UE based on a metric such as signal to interference and noise ratio (SINR). Finally, the CQI is a value indicating channel strength, and generally means a reception SINR that may be obtained by the eNB when the PMI is used.

In the 3GPP LTE-A system, the eNB may configure a plurality of CSI processes for the UE, and may be reported CSI for each of the CSI processes. In this case, the CSI process includes CSI-RS resource for specifying signal quality and CSI-IM (interference measurement) resource, that is, IMR (interference measurement resource) for interference measurement.

Since a wavelength becomes short in the field of Millimeter Wave (mmW), a plurality of antenna elements may be installed in the same area. In more detail, a wavelength is 1 cm in a band of 30 GHz, and a total of 64(8×8) antenna elements of a 2D array may be installed in a panel of 4 by 4 cm at an interval of 0.5 lambda(wavelength). Therefore, a recent trend in the field of mmW attempts to increase coverage or throughput by enhancing BF (beamforming) gain using a plurality of antenna elements.

In this case, if a transceiver unit (TXRU) is provided to control a transmission power and phase per antenna element, independent beamforming may be performed for each frequency resource. However, a problem occurs in that effectiveness is deteriorated in view of cost when TXRU is provided for all of 100 antenna elements. Therefore, a scheme is considered, in which a plurality of antenna elements are mapped into one TXRU and a beam direction is controlled by an analog phase shifter. Since this analog beamforming scheme may make only one beam direction in a full band, a problem occurs in that frequency selective beamforming is not available.

As an intermediate type of digital BF and analog BF, a hybrid BF having B TXRUs smaller than Q antenna elements may be considered. In this case, although there is a difference depending on a connection scheme of B TXRUs and Q antenna elements, the number of beam directions that enable simultaneous transmission is limited to B or less.

Figure 7:
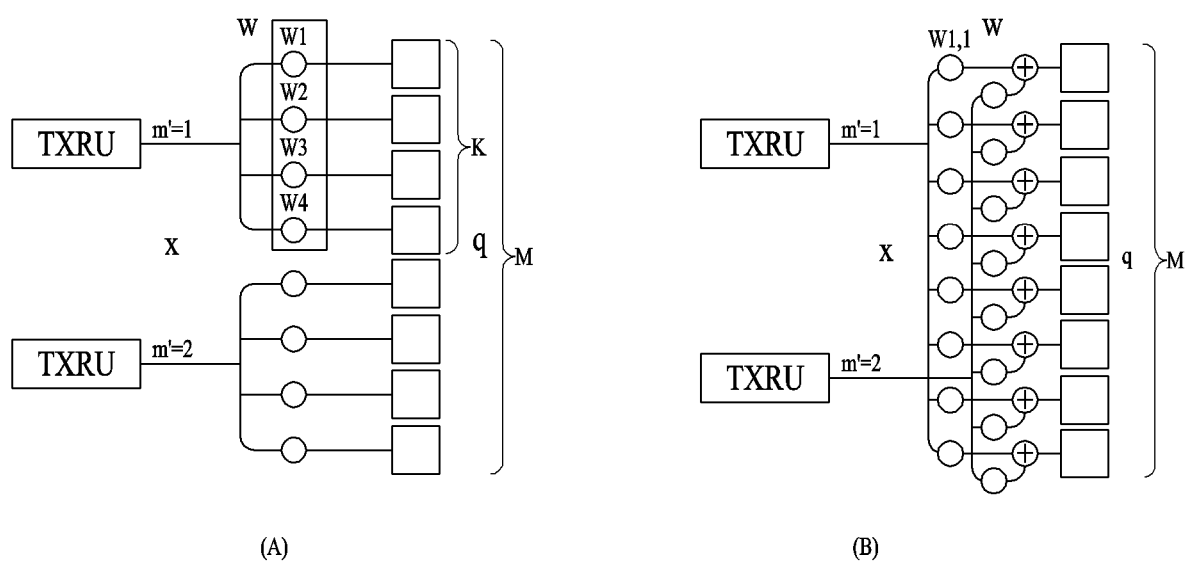
FIG. 7 illustrates examples of a connection scheme between TXRUs and antenna elements.

FIG. 7 illustrates examples of a connection scheme between TXRUs and antenna elements.

(a) of FIG. 7 illustrates that TXRU is connected to a sub-array. In this case, the antenna elements are connected to only one TXRU. Unlike (a) of FIG. 7, (b) of FIG. 7 illustrates that TXRU is connected to all antenna elements. In this case, the antenna elements are connected to all TXRUs. In FIG. 7, W indicates a phase vector multiplied by an analog phase shifter. That is, a direction of analog beamforming is determined by W. In this case, mapping between CSI-RS antenna ports and TXRUs may be 1-to-1 or 1-to-many.

As more communication devices require greater communication capacity, the need of mobile broadband communication more advanced than the conventional RAT (radio access technology) has been issued. Also, massive MTC (Machine Type Communications) technology that provides various services anywhere and at any time by connecting a plurality of devices and things is one of main issues which will be considered in next generation communication. Furthermore, a communication system design considering service/UE susceptible to reliability and latency has been discussed. Considering this status, the introduction of the next generation RAT has been discussed, and the next generation RAT will be referred to as NewRAT in the present invention.

A self-contained subframe structure shown in FIG. 8 is considered in the fifth generation NewRAT to minimize data transmission latency in a TDD system. FIG. 8 illustrates an example of a self-contained subframe structure.

In FIG. 8, oblique line areas indicate downlink control regions and black colored areas indicate uplink control regions. Areas having no mark may be used for downlink data transmission or uplink data transmission. In this structure, downlink transmission and uplink transmission are performed in due order within one subframe, whereby downlink data may be transmitted and uplink ACK/NACK may be received within the subframe. As a result, the time required for data re-transmission may be reduced when an error occurs in data transmission, whereby latency of final data transfer may be minimized.

In this self-contained subframe structure, a time gap for switching from a transmission mode to a reception mode or vice versa is required for the eNB and the UE. To this end, some OFDM symbols (OS) at the time when a downlink is switched to an uplink in the self-contained subframe structure are set to a guard period.

Examples of the self-contained subframe type that may be configured in the system operating based on the NewRAT may consider four subframe types as follows.

downlink control period+downlink data period+GP+uplink control period downlink control period+downlink data period downlink control period+GP+uplink data period+uplink control period downlink control period+GP+uplink data period FIG. 8(b) shows subframe types of (1) and (3) among the above-described four subframe types.

In such a structure, one or more symbols may be allocated for the downlink control channel and control information may be transmitted using the downlink control channel. At this time, a resource element group (REG) which is a minimum unit for transmitting control information may be configured, and a predetermined number of REGs may be grouped to configure a control channel element (CCE). For example, the REG may be configured in units of one resource block (RB) and the CCE may be configured in units of 6 REGs.

Meanwhile, upon configuring the CCE, REGs may be dispersed on physical resources for diversity effect. At this time, an interleaver may be used.

In the present invention, a method of configuring an interleaver on a downlink control channel which may be considered in NewRAT is proposed.

Method of Designing Interleaver Based on Bundling Between REGs

In NewRAT, unlike the existing LTE system, a COntrol REsource SET (CORESET) may be specified for each user and/or each user group. In addition, only a UE-specific RS may be transmitted instead of a cell-specific RS (reference signal). In this case, a plurality of REGs may be continuously bundled and arranged and channel estimation may be performed using all UE-specific RSs present in bundle units, thereby increasing channel estimation performance.

For example, if one CCE is composed of six REGs, the REGs may be bundled in two or three units. The REG bundling unit may be predefined in a system or signaled from a base station to a user through higher layer signaling and/or through physical layer signaling.

Meanwhile, when bundling between the REGs is performed, the REGs may be bundled on a time axis, a frequency axis, or time and frequency axes. When a plurality of REGs is bundled, since the plurality of bundled REGs may be continuously arranged on actual physical resources, the interleaver should be applied in bundled REG units.

Although the case where REGs configuring a CCE are bundled on a time axis or a frequency axis is described in the present invention, the REGs may be bundled on the time axis and the frequency axis according to the number of REG bundles. For example, if the REG bundling unit is 4, two REGs are bundled on the time axis and the two REGs bundled on the time axis may be bundled on the frequency axis.

In this case, the bundle unit index described in the present invention may correspond to a plurality of REG groups bundled on the time axis and the frequency axis.

Embodiment 1: Method of designing interleaver when REGs are bundled on time axis.

If a CORESET is composed of two or more symbols on the time axis, bundling REGs on the time axis may be considered. At this time, as shown in FIG. 9, the time-axis bundling size of the REGs may be configured to be equal to the duration of the CORESET.

For example, if the number of REGs configuring one CCE is 6, the REGs may be dispersed on the frequency axis within one symbol without being bundled on the time axis when the CORESET duration is composed of 1 symbol, and the time-axis bundling size of the REGs may be set to 2 or 3 and then the REGs may be dispersed on the frequency axis in bundle units when the CORESET duration is composed of two symbols or three symbols.

At this time, the REG bundling size may be set differently from the CORESET duration. At this time, the REG bundling size may be predefined in a system, may be signaled from the base station to the UE through higher layer signaling and/or physical layer signaling, or may be determined according to the configuration (e.g., CORESET duration) of the CORESET.

Similarly, whether REG bundling is made on the time axis or the frequency axis may be predefined in a system, may be signaled from the base station to the UE through higher layer signaling and/or physical layer signaling, may be determined according to the configuration (e.g., CORESET duration) of the CORESET, or may be determined according to the CCE bundling configuration.

At this time, as the method of dispersing the REGs, which are bundled on the time axis, on the frequency axis, the REGs may be dispersed in bundle units as much as possible at regular intervals in the bandwidth of the CORESET as shown in FIG. 9 or may be randomly dispersed in bundle units at irregular intervals. However, when bundling is not performed, the REGs may be dispersed in REG units.

Embodiment 1-1: Method of Randomly Dispersing Regs in Bundle Units

A block interleaver may be used in order to randomly disperse REGs in bundle units. For example, if the maximum number of REG bundles which may be included in the CORESET configured for the UE is m, the logical indices of REG bundles may be sequentially mapped to a matrix, the number of columns of which is fixed to k, row by row.

At this time, the number 1 of rows of the matrix is a minimum integer satisfying $m \leq l \times k$. If $m \leq l \times k$, an $l \times k$ matrix may be configured by filling the end of a last row with $l \times k - m$ null values. Thereafter, permutation is applied column by column using a predefined column permutation pattern and then elements are sequentially arranged column by column starting from the element of a first column, thereby interleaving the logical indices of the REG bundles.

At this time, when the interleaved indices of the REG bundles are mapped in the physical domain, the logical indices of a plurality of REGs originally grouped in REG bundle units are sequentially mapped on the time axis, thereby randomly dispersing the REGs to the CORESET in bundle units in consideration of the time-axis bundle unit.

Here, the column size of the interleaved matrix and the column permutation pattern may be predefined in the system or may be signaled from the base station to the UE through higher layer signaling and/or physical layer signaling.

FIG. 10 illustrates the detailed example of the above description. Referring to FIG. 10, one CCE includes 6 REGs, an REG bundle unit is 2, m=6, k=5 and l=2, and the column permutation pattern is <4,2,1,3,0>.

In the example of FIG. 10, since the number of REGs is extremely limited in order to facilitate understanding of the present invention, dispersing of the REG bundles is limited. However, since the CORESET size actually specified in the system is sufficiently large, the REG bundle units may be sufficiently randomly dispersed on the frequency axis.

Meanwhile, although the number of columns is described as being fixed in FIG. 10 and the above-described embodiment, the above-described embodiment is applicable to the case where the number of rows is fixed.

To describe this in detail, a method of dispersing REGs in bundle units based on a matrix, the number of rows of which is fixed, will be described with reference to FIG. 11.

Referring to FIG. 11, if the maximum number of REG bundles which may be included in the CORESET configured for the UE is m, the logical indices of the REG bundles may be mapped to a matrix, the number of rows of which is fixed to k, column by column.

In FIG. 11, since one CCE includes 6 REGs, the REG bundle unit is 2, and m=6 and k=5, the number 1 of columns of the matrix satisfying $m \leq l \times k$ is 2.

In addition, since $m < l \times k$, a $k \times l$ matrix, that is, a 5×2 matrix, may be configured by filling the end of a last column with $l \times k - m = 2 \times 5 - 6 = 4$ null values. Thereafter, permutation is applied row by row using a predefined row permutation pattern and then elements are sequentially arranged row by row starting from the element of a first row, thereby interleaving the logical indices of the REG bundles.

At this time, when the interleaved indices of the REG bundles are mapped in the physical domain, the logical indices of a plurality of REGs originally grouped in REG bundle units are sequentially mapped on the time axis, thereby randomly dispersing the REGs to the CORESET in bundle units in consideration of the time-axis bundle unit.

Here, the row size of the interleaved matrix and the row permutation pattern may be predefined in the system or may be signaled from the base station to the UE through higher layer signaling and/or physical layer signaling.

Embodiment 1-2: Method of Dispersing Regs in Bundle Units at Regular Interval

In order to maximize the frequency diversity effect on the frequency axis, the REG bundle units may be configured to be spread as evenly as possible in the bandwidth of the CORESET. In such a configuration, the number of columns of the matrix in the block interleaver operation may be set to the number of units corresponding to one CCE (e.g., REG bundles corresponding to one CCE) and the column or row permutation process may not be performed. Here, the column or row permutation process being not performed may mean that the column or row permutation pattern is <0,1,2,3,4> based on the Embodiment 1-1.

Figure 12:
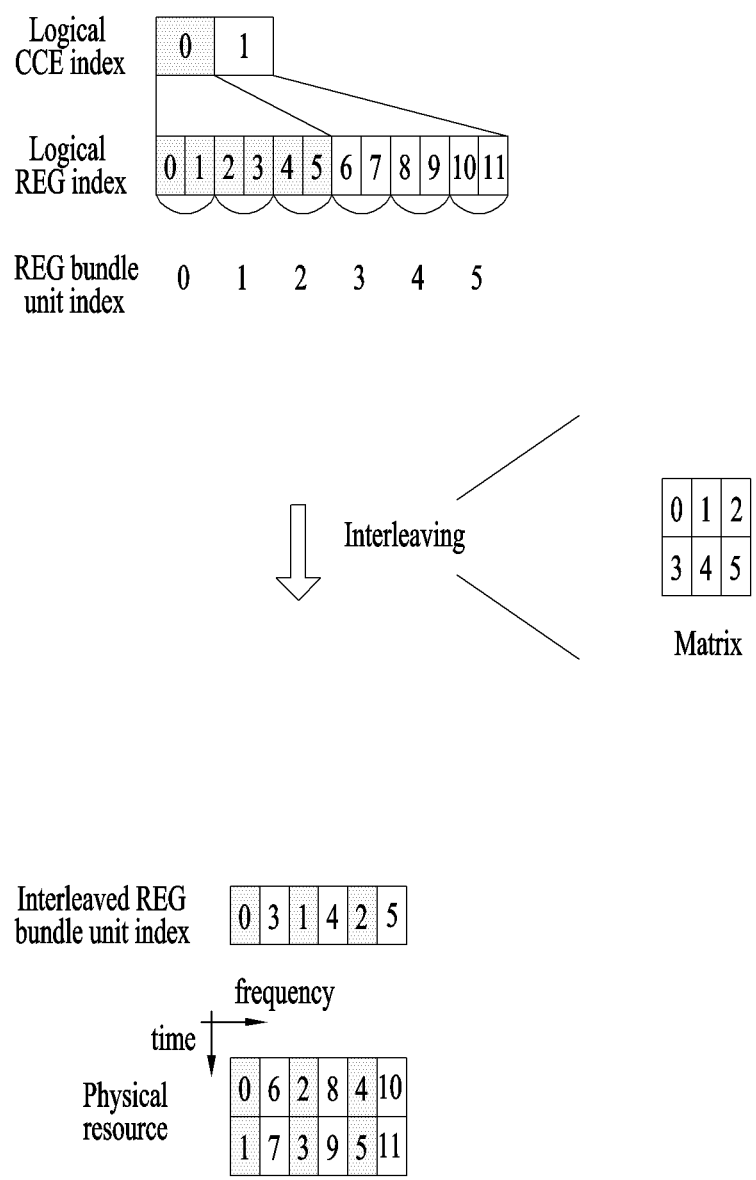

In FIG. 12, if one CCE includes 6 REGs and the REG bundling unit is 2, since the number of REG bundle indices corresponding to one CCE is 3, the number of columns of the matrix may be set to 3 to be equal to the number of REG bundles corresponding to one CCE.

That is, since the number of columns is 3, the number of rows is 2. This is because the number of 1s satisfying $m \leq l \times k$ is 2 (m=6 and l=3). Thereafter, the logical indices of the REG bundles may be sequentially mapped to the matrix row by row and the elements may be sequentially arranged column by column starting from the element of the first column, thereby interleaving the logical indices of the REG bundles.

At this time, when the interleaved indices of the REG bundles are mapped in the physical domain, the logical indices of a plurality of REGs originally grouped in REG bundle units are sequentially mapped on the time axis, thereby dispersing the REGs to the CORESET in bundle units at a regular interval in consideration of the time-axis bundle unit.

Figure 13:
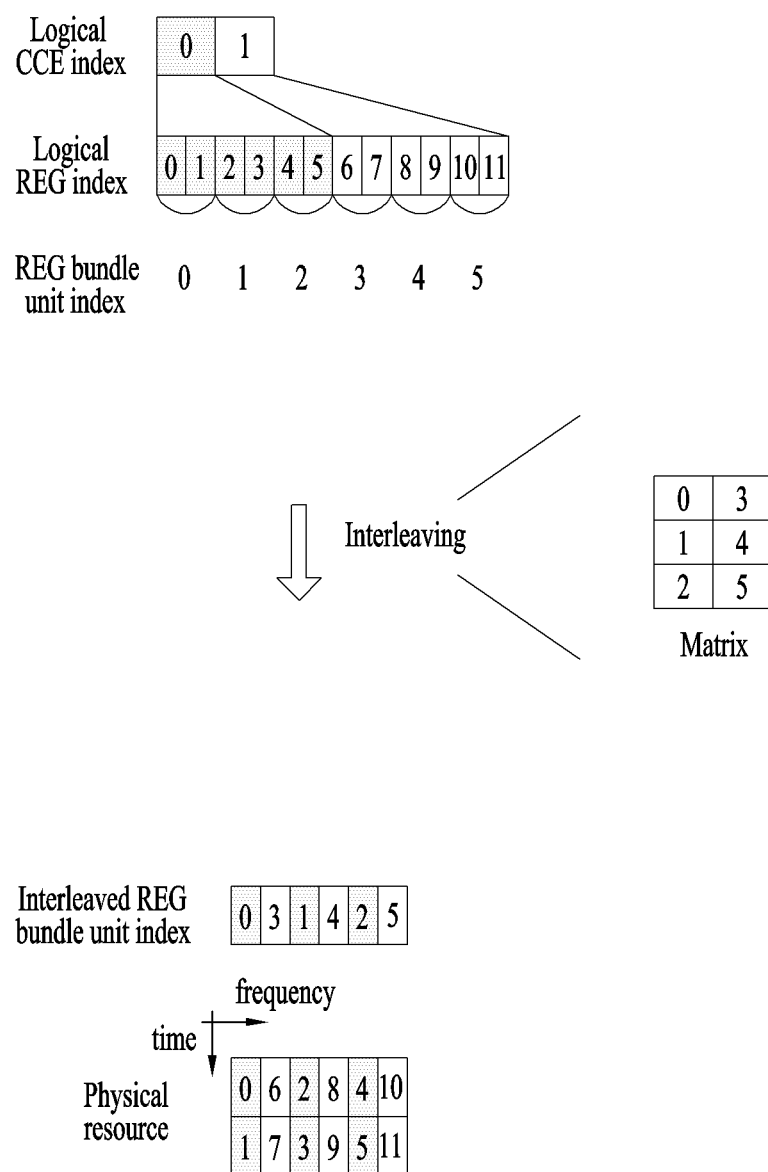

Referring to FIG. 13, when the number of rows is 3, the number of columns is 2. Thereafter, the logical indices of the REG bundles may be sequentially mapped to the matrix column by column and the elements may be sequentially arranged row by row starting from the element of the first row, thereby interleaving the logical indices of the REG bundles.

At this time, when the interleaved indices of the REG bundles are mapped in the physical domain, the logical indices of a plurality of REGs originally grouped in REG bundle units are sequentially mapped on the time axis, thereby dispersing the REGs to the CORESET in bundle units at a regular interval in consideration of the time-axis bundle unit.

Meanwhile, as described in Embodiment 1-1, the column size of the interleaving of FIG. 12 or the row size of the interleaving matrix of FIG. 13 may be predefined in the system or may be signaled from the base station to the UE through higher layer signaling and/or physical layer signaling.

Embodiment 2: Method of Designing Interleaver when Regs are Bundled on Frequency Axis If REGs are bundled on the frequency axis, as shown in FIG. 14, even when the CORESET includes a plurality of symbols, REGs configuring one CCE may be present in one symbol.

Embodiment 2-1: Method of Randomly Dispersing REGs in Bundle Units

The method described in Embodiment 1-1 is applicable to the method of randomly dispersing the REGs in bundle units without change. As shown in FIGS. 15 and 16, when the interleaved bundle unit indices are mapped to physical resources, the indices of the REGs included in one bundle unit may be continuously mapped on the frequency axis, thereby randomly dispersing the REGs on the frequency axis while maintaining the bundle unit.

Figure 17:
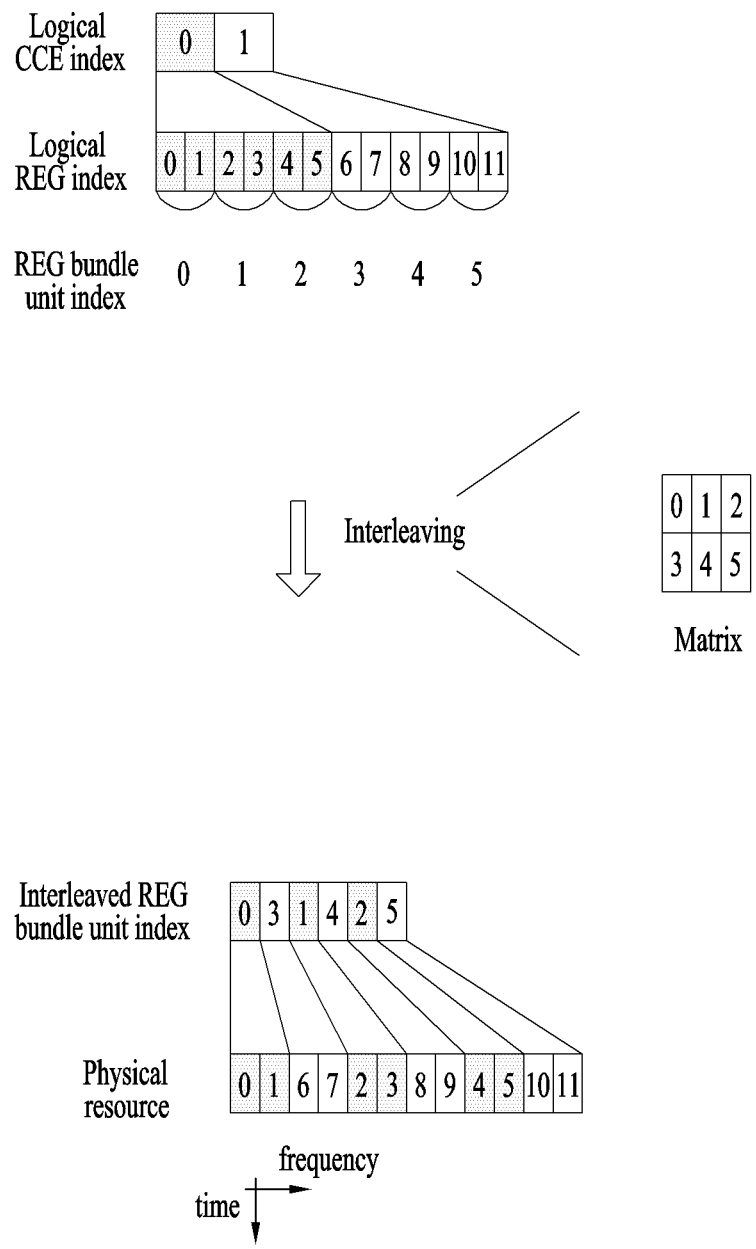

Embodiment 2-2: Method of Randomly Dispersing REGs in Bundle Units at Regular Interval The method described in Embodiment 1-2 is applicable to the method of dispersing the REGs in bundle units at a regular interval without change. As shown in FIGS. 17 and 18, when the interleaved bundle unit indices are mapped to physical resources, the indices of the REGs included in one bundle unit may be continuously mapped on the frequency axis, thereby dispersing the REGs on the frequency at a regular interval while maintaining the bundle unit.

Embodiment 3: Case where Bandwidth of CORESET is not Multiple of REG Bundle Unit The bandwidth of the CORESET may be configured to have a size which is not a multiple of the number of REGs configuring the REG bundle unit. In this case, the remaining region which cannot configure the REG bundle unit may be configured to be located at the front or back of the bandwidth region of the physical domain in which the CORESET is configured.

At this time, when interleaving is performed based on the REG bundle unit index, the REG bundle unit index is further indexed in consideration of the remaining region which cannot configure the REG bundle unit and then interleaving is performed. Rate matching may be performed with respect to the logical REG bundle unit index mapped to the physical resource located at the front or back of the bandwidth region in which the CORESET is configured.

Figure 19:
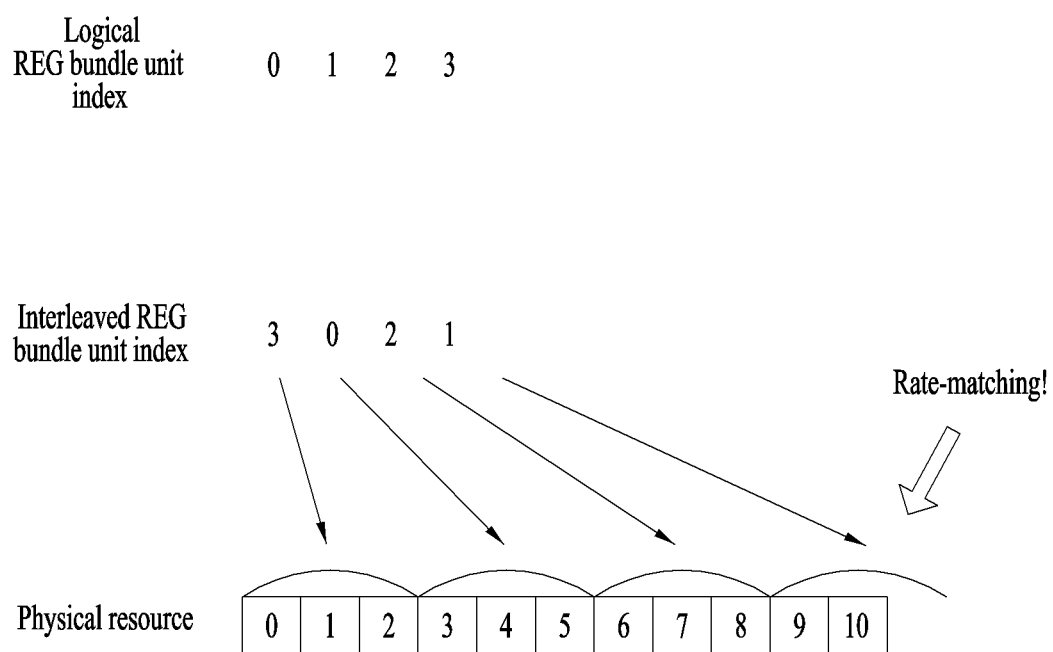
FIGS. 19 to 20 are views showing embodiments of mapping REGs to physical resources.

That is, in the situation shown in FIG. 19, rate matching may be performed with respect to control information corresponding to logical REG bundle unit index #1.

Figure 20:
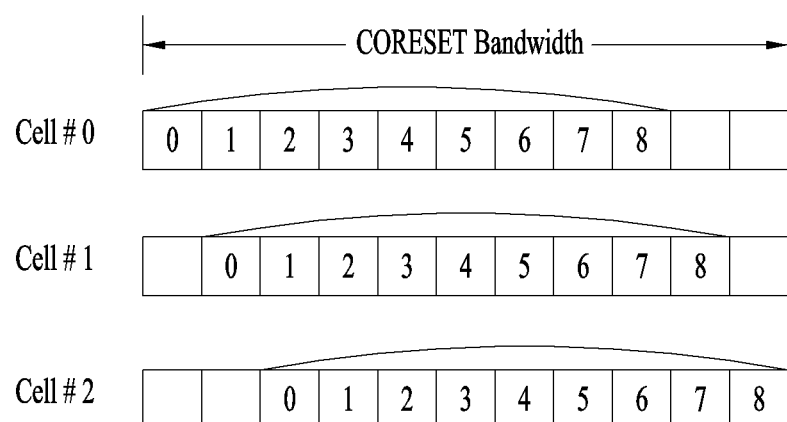

Meanwhile, as shown in FIG. 20, the remaining region which cannot configure the REG bundle unit may be configured to be located at the front or back of the bandwidth region of the physical domain in which the CORESET is configured, and the REG bundle unit indices excluding the corresponding region are indexed to perform interleaving. That is, even when mapping is performed in the physical domain through interleaving, the corresponding region may not be used.

If the CORESET is equally set among different base station or cells and the bandwidth of the CORESET is set to a size which is not a multiple of the number of REGs configuring the REG bundle unit, the remaining region which cannot configure the REG bundle unit may be interleaved using the above-described method and may be used to reduce inter-cell interference instead of being used to map the control information. For example, as shown in FIG. 20, a value $v_{shift}$ may be set using cell-specific information such as a cell ID and the bandwidths of the CORESETs of different cells are differently set.

Meanwhile, if there is no remaining region, that is, if the bandwidth of the CORESET is set to a size which is a multiple of the number of REGs configuring the REG bundle unit, the position and/or size of the bandwidth of the CORESET may be differently set for each cell in order to reduce inter-cell interference.

Method of Applying Bundling Between CCEs

If CCE aggregation is performed, the REGs may be bundled on the frequency axis while being bundled on the time axis. Therefore, frequency-axis bundling may be performed between REG bundle units included in different CCEs.

Similarly, if CCE aggregation is performed, the REGs may be bundled on the time axis between the REG bundle units included in different CCEs while being bundled on the frequency axis.

Figure 21:
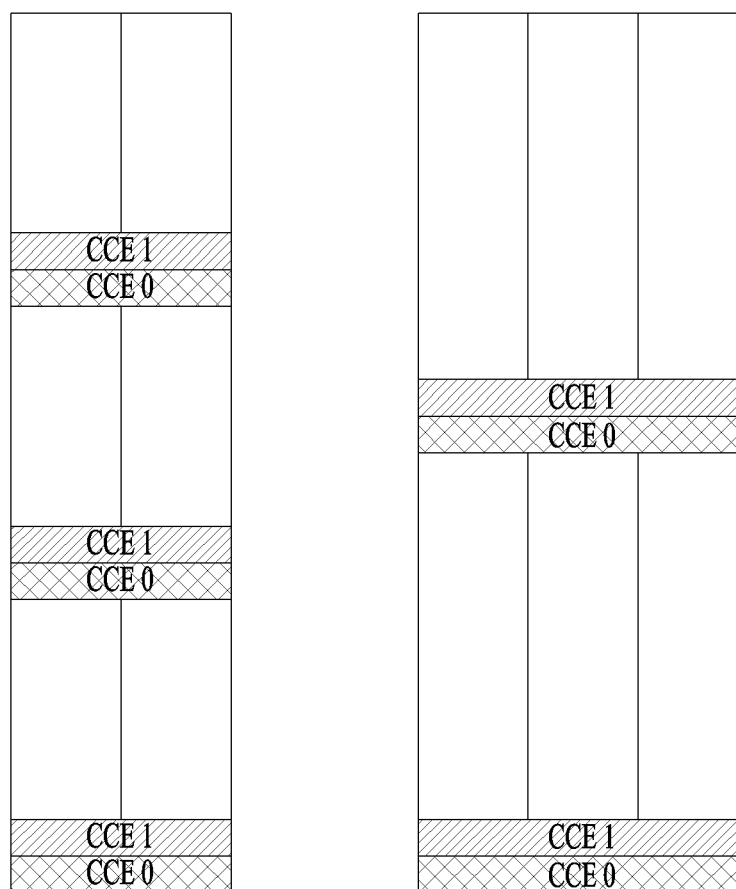
FIG. 21 is a view showing an embodiment of bundling CCEs.

In this case, a CCE bundle unit in which bundling between CCEs is performed may be set. At this time, the size of the CCE bundling unit and/or whether CCE bundling is performed on the time axis or the frequency axis may be predefined in the system, may be signaled from the base station to the UE through higher layer signaling and/or physical layer signaling, or may be set according to the CORESET configuration (e.g., CORESET duration). Alternatively, whether CCE bundling is performed on the time axis or the frequency axis may be determined according to the REG bundling configuration. That is, if REG bundling is performed on the time axis, CCE bundling may be performed on the frequency axis. In contrast, if REG bundling is performed on the frequency axis, CCE bundling may be performed on the time axis FIG. 21 shows an embodiment in which the CCE bundling unit is 2 on the frequency axis in a state in which REGs configure an REG bundle unit on the time axis by the length of the CORESET duration.

Embodiment 4: Method of performing interleaving at random intervals between bundle chunks An example of randomly performing interleaving in bundle chunk units will be described with reference to FIGS. 22 and 23. The principle of the method of randomly performing interleaving in bundle chunk units may be equal to that of the method of performing interleaving in REG bundle units of Embodiment 1-1 and Embodiment 1-2.

Figure 22:
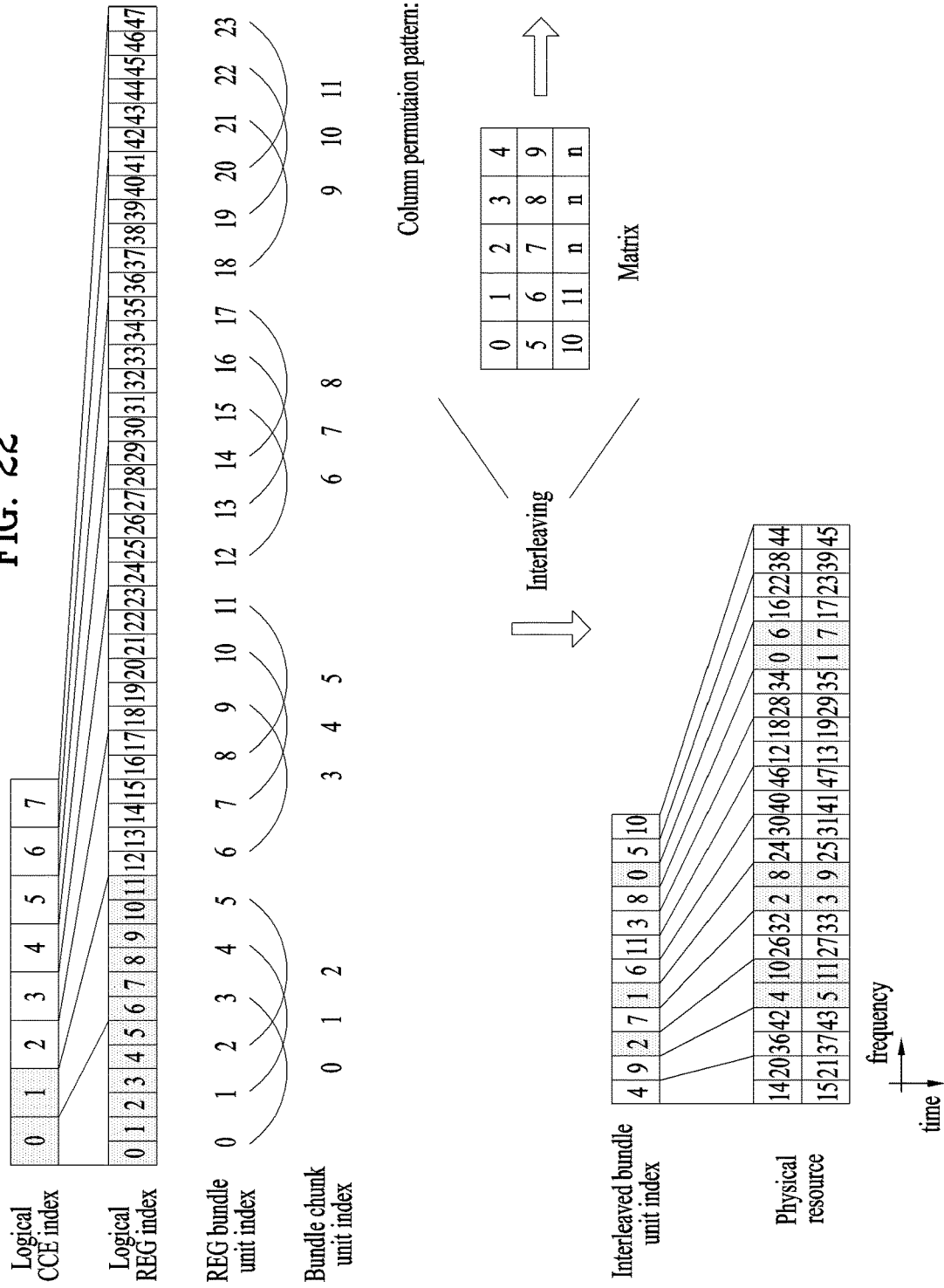
FIGS. 22 to 27 are views showing embodiments of dispersing REGs in bundle chunk units.
Figure 23:
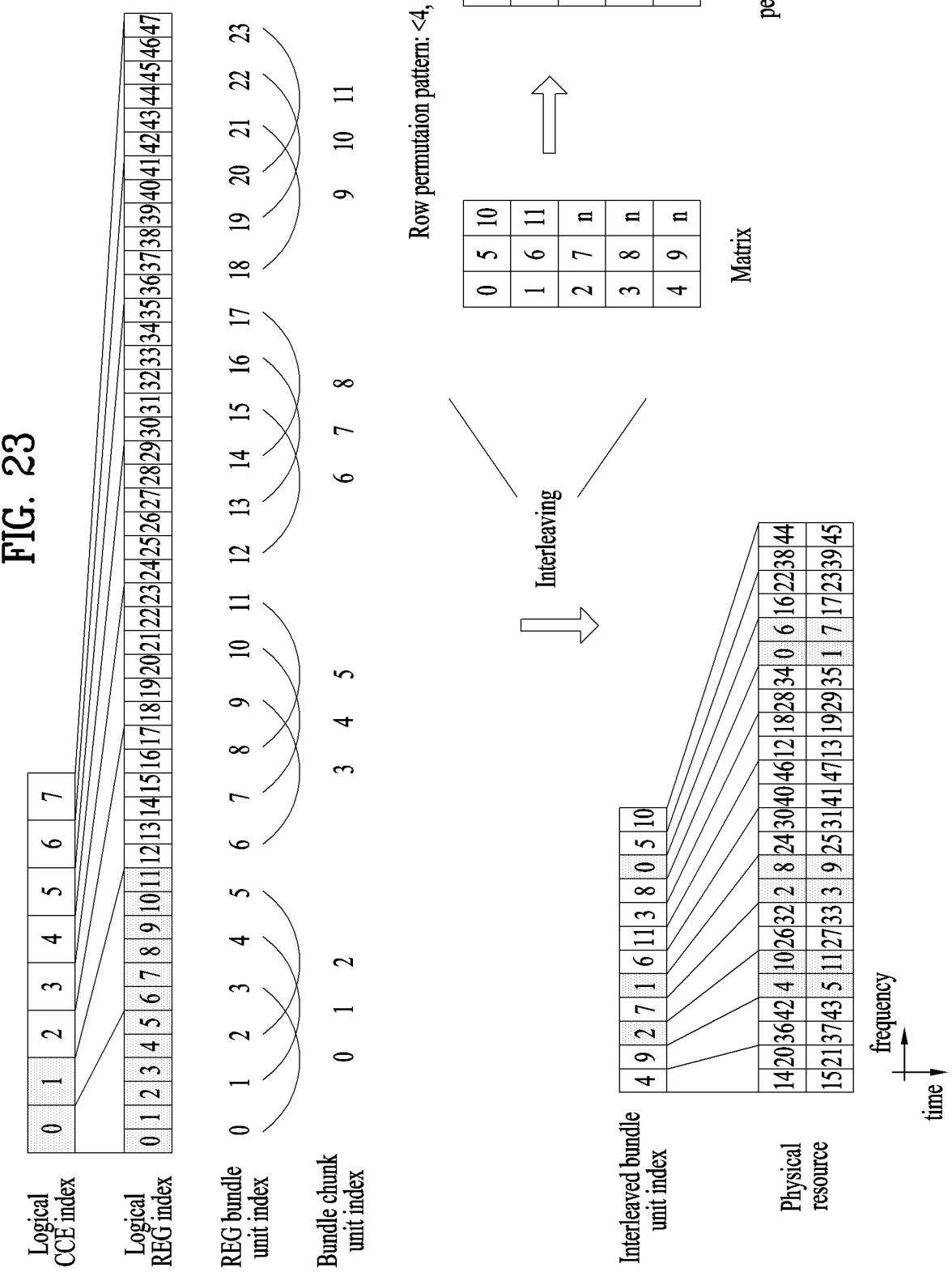

However, in FIG. 22, REG bundle units belonging to different CCEs to be bundled may be grouped to configure a new bundling unit. For example, if the size of each of the REG bundle unit and the CCE bundle unit is 2, the indices of the logical REGs configuring logical CCE index 0 may be 0, 1, 2, 3, 4 and 5 and the indices of the logical REGs configuring logical CCE index 1 may be 6, 7, 8, 9, 10 and 11.

In this case, since the size of the REG bundle unit is 2, CCE 0 may be configured in REG bundle units of (0, 1), (2, 3) and (4, 5) and CCE1 may be configured in REG bundle units of (6, 7), (8, 9) and (10, 11). At this time, since the size of the CCE bundle unit is 2, the REG bundle units belonging to the respective CCEs may form a pair such that {(0, 1), (6, 7)}, {(2, 3), (8, 9)} and {(4, 5), (10, 11)} configure respective new bundle chunks. Thereafter, if a new index is indexed into each of the bundle chunks, an interleaver is applied based on the indexes and bundling is applied to the CCEs and the REGs, the CCEs and the REGs may be dispersed on the frequency axis in bundle units.

For example, if bundling between the REGs is performed on the time axis and bundling between the CCEs is performed on the frequency axis, when interleaved bundle chunk indices are mapped to the physical resources, the REG index belonging to the REG bundle index in the bundle chunk may be mapped on the time axis in the corresponding region and the REG bundles may be mapped on the frequency axis.

In contrast, if bundling between the REGs is performed on the frequency axis and bundling between the CCEs is performed on the time axis, the REG index belonging to the REG bundle index in the bundle chunk may be mapped on the frequency axis in the corresponding region and the REG bundles may be mapped on the time axis. The size of the columns or rows of the interleaved matrix and the column or row permutation pattern may be predefined in the system or may be signaled from the base station to the UE through higher layer signaling and/or physical layer signaling.

Figure 24:
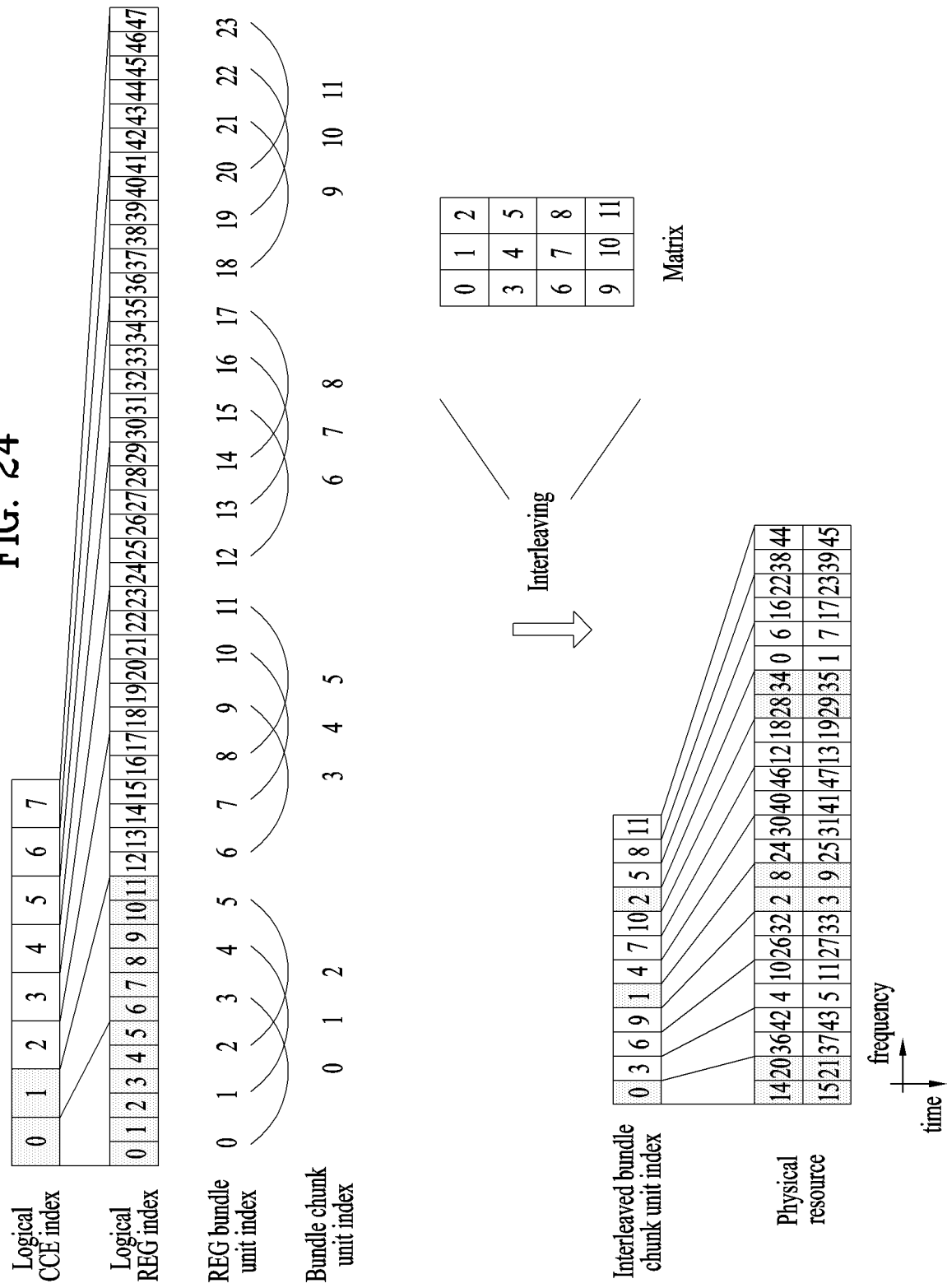
Figure 25:
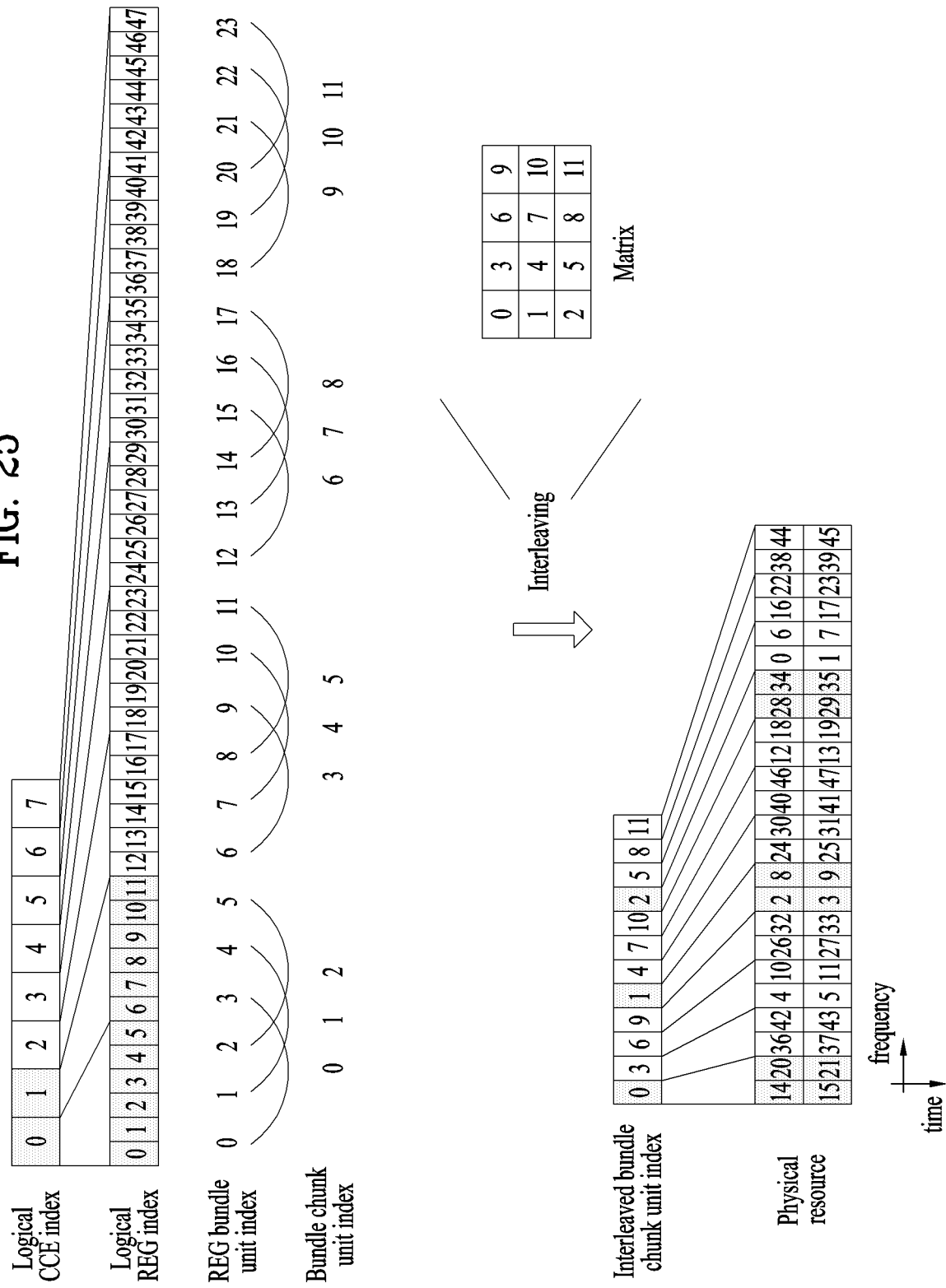

Embodiment 5: Method of Performing Interleaving Between Bundle Chunks at Regular Interval An embodiment of performing interleaving between bundle chunks at a regular interval will be described with reference to FIGS. 24 and 25. When the size of the columns or rows of the interleaver matrix is set to the number of bundle chunk unit indices corresponding to the CCE bundling unit and column or row permutation is not applied, as shown in FIGS. 24 and 25, interleaving between bundle chunks may be performed at a regular interval.

When interleaving between bundle chunks is performed at the regular interval, if the CCE aggregation size and the CCE bundling size are differently set, interleaving may be performed such that the bundle chunks are further dispersed on the physical resources in CCE bundling size units.

Figure 26:
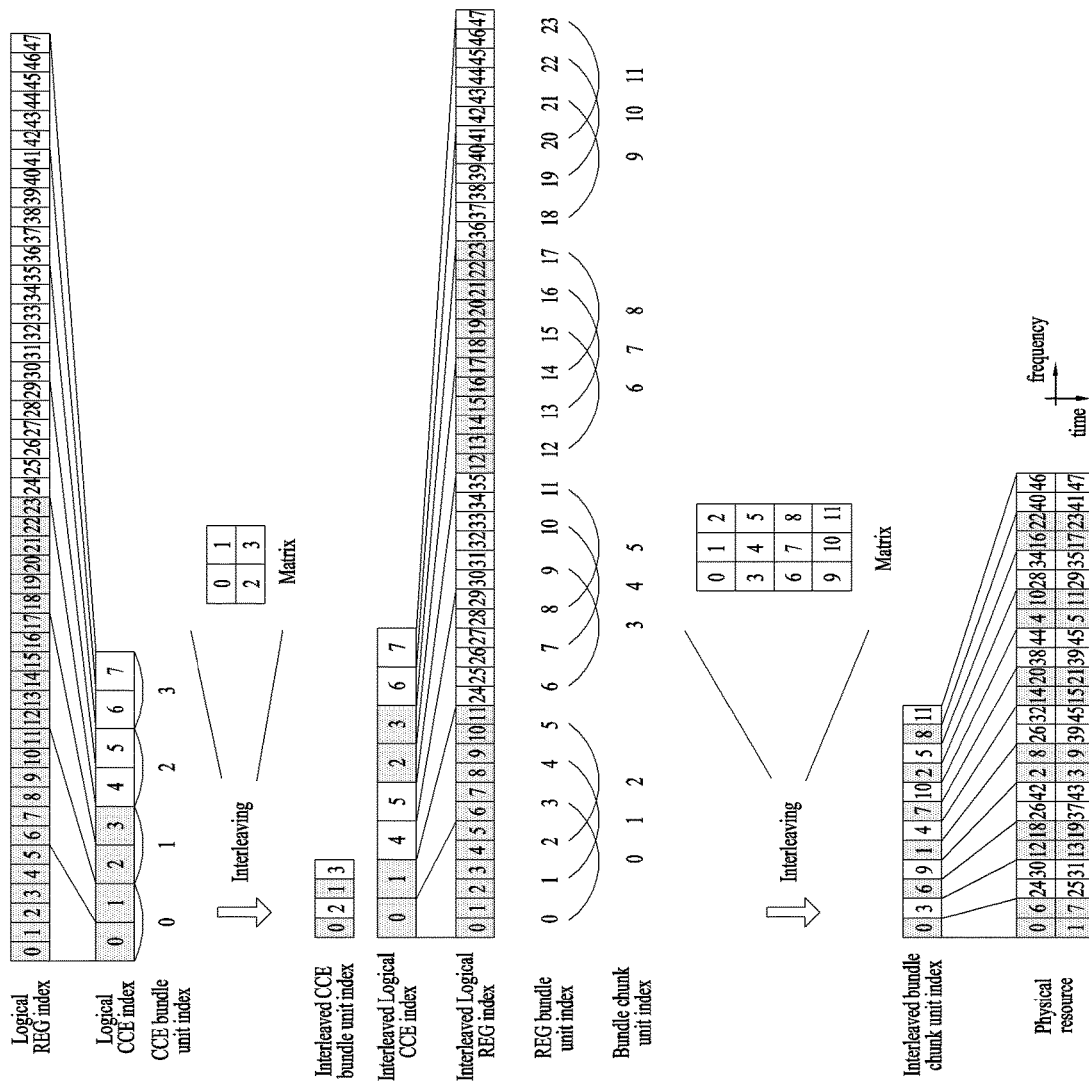
Figure 27:
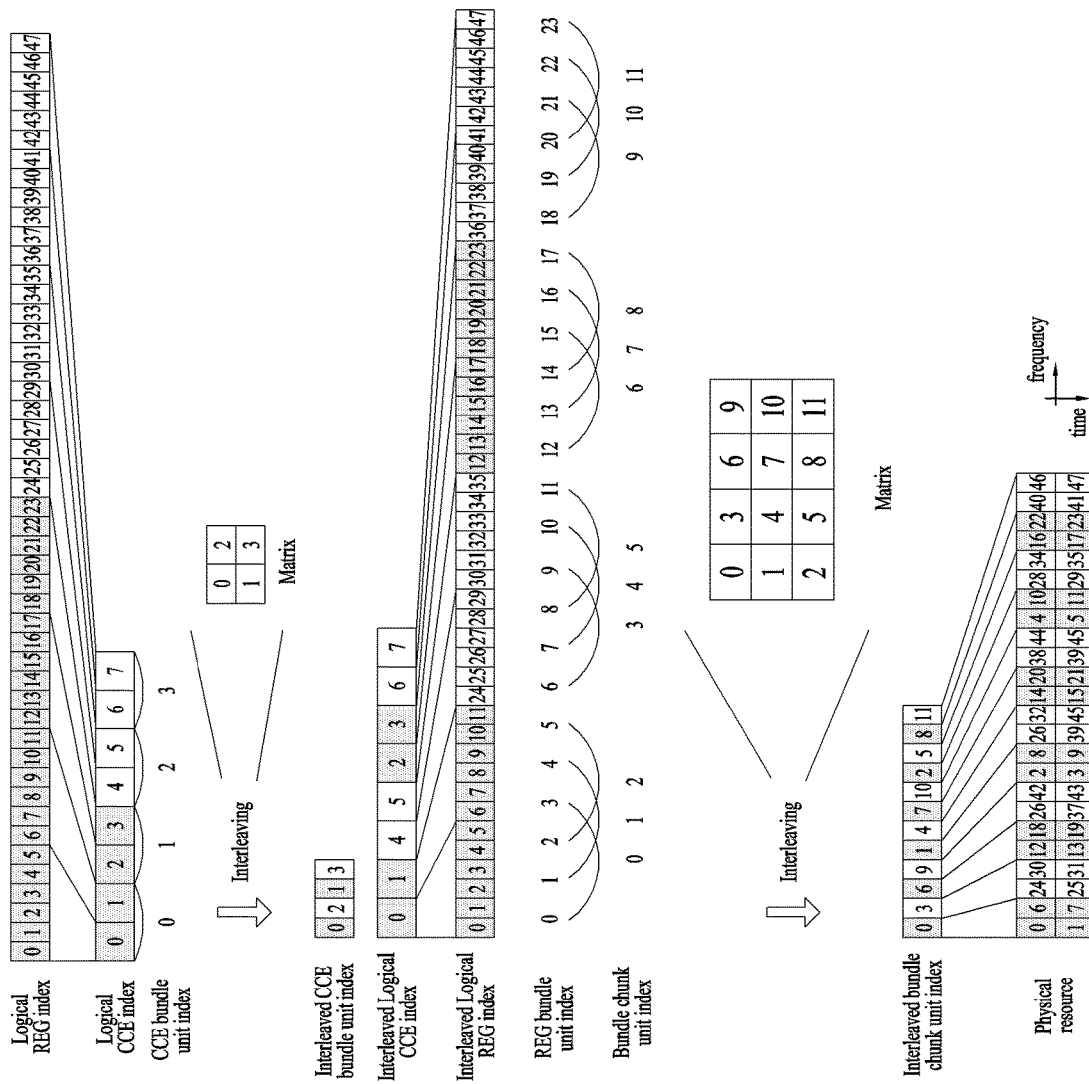

For example, the indices may be indexed in CCE bundle units for the logical CCE indexes and interleaving may be applied to the CCE bundle units. Thereafter, after interleaving is performed based on the CCE bundle unit, when the logical indices of the CCEs belonging to the CCE bundle unit are listed, it is possible to configure interleaved logical CCE indices. When the interleaved logical CCE indices are associated with the logical CCE indices described in Embodiments 1 to 2, the same result as the embodiments of FIGS. 26 and 27 can be obtained.

At this time, the number of columns or rows of the matrix for interleaving the CCE bundle unit indices may be set to the number of CCE bundle unit indices corresponding to the CCE aggregation level. In addition, the REG indices corresponding to the interleaved logical CCE indices may be listed to configure interleaved logical REG indices and the REG bundle unit indices may be sequentially indexed.

For bundling between CCEs, as in Embodiment 4, REG bundle units belonging to different CCEs to be bundled may be grouped and indexed with bundle chunk unit indices and interleaving may be performed with respect to the bundle chunk unit indices. Here, the number of rows or columns of the matrix for interleaving the bundle chunk unit indices may be set to the number of bundle chunk unit indices corresponding to the size of the CCE bundle unit. In addition, when the interleaved bundle chunk indices are mapped to the physical resources, if bundling between REGs is performed on the time axis and bundling between CCEs is performed on the frequency axis, the REG indices belonging to each REG bundle index in the bundle chunk may be mapped on the time axis in the corresponding region and the REG bundles may be mapped on the frequency axis.

In contrast, if bundling between REGs is performed on the frequency axis and bundling between CCEs is performed on the time axis, the REG indices belonging to each REG bundle index in the bundle chunk may be mapped on the frequency axis in the corresponding region and the REG bundles may be mapped on the time axis. By this configuration, when the CCEs configuring the CCE aggregation level are interleaved, the CCEs may be dispersed on the frequency axis in CCE bundle units as much as possible at a regular interval, thereby maximizing channel estimation performance through bundles and frequency diversity effect through a configuration in which the CCEs are spaced apart from each other in CCE bundle units on the frequency axis.

Method of Configuring CORESET

Hereinafter, a method of configuring RBs configuring the CORESET will be described independently of the interleaver design. The RBs configuring the CORESET may be continuously or separately configured in the frequency region and a combinational index defined in a legacy LTE system may be configured through higher layer signaling.

For example, the combinational index shown in Equation 1 may be used. Here, $$r = \sum_{i=0}^{N_{RB}^{X_p}-1} \binom{N_{RB}^{DL} - k_i}{N_{RB}^{X_p} - i}$$ [Equation 1]

denotes a PRB index, $N_{RB}^{X_p}$ denotes the number of RBs of the CORESET p, and $N_{RB}^{X_p}$ denotes the downlink bandwidth of the system.

$$\{k_i\}_{i=0}^{N_{RB}^{X_p}-1}, (1 \le k_i \le N_{RB}^{DL}, k_i < k_{i+1})$$

If the combinational index is configured in consideration of the bundling size, $N_{RB}^{X_P}$ and $N_{RB}^{DL}$ of Equation 1 may be replaced by $N_{RB}^{X_P}$/(bundling size) and $N_{RB}^{DL}$/(bundling size). The combinational index derived using the above-described method may correspond to RB arrangement of the CORESET continuously or separately configured in bundle units. For example, if the size of the CORESET is 8 and the bundling size is 2 in an environment in which the downlink bandwidth is composed of 50 RBs, $N_{RB}^{X_P}$/(bundling size)=4 and $N_{RB}^{DL}$/(bundling size)=25 are set to be substituted into $N_{RB}^{X_P}$ and $N_{RB}^{DL}$ of Equation 1 above, and the derived combinational index may correspond to RB arrangement of the CORESET continuously or separately arranged in the downlink bandwidth in units of 2RBs which are the bundle units.

Intra-CCE or inter-CCE REG bundling may be performed as follows.

Figure 28:
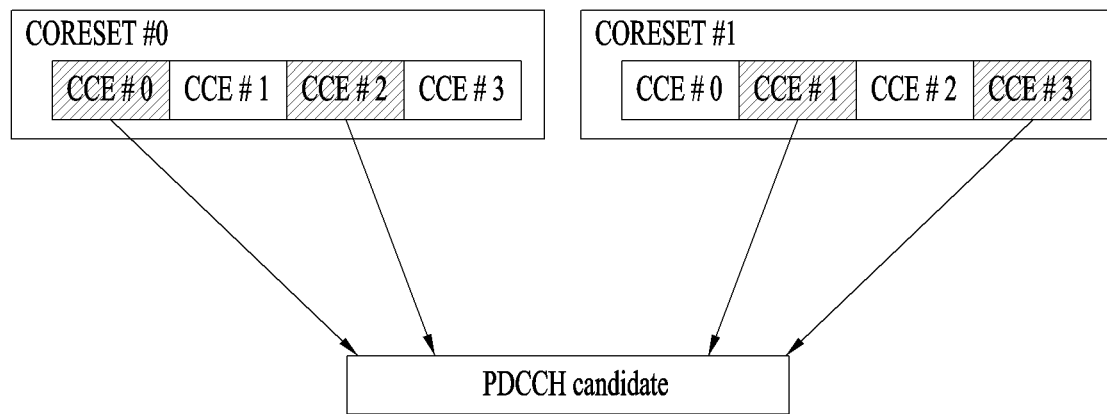
FIG. 28 is a view showing an embodiment of a method of configuring a candidate downlink control channel.

Referring to FIG. 28, inter-CCE REG bundling will be described. REG bundling may be configured for each CORESET. If one candidate PDCCH is composed of CCEs belonging to several CORESETs, a set of inter-CCE bundles may be changed. For example, in the case where the inter-CCE is configured over 2 CCEs, if a first CCE and a third CCE of the candidate PDCCH are included in CORESET 1 and a second CCE and a fourth CCE are included in CORESET 2 for AL=4, it is assumed that inter-CCE bundling for CORESET 1 is performed through 1 and 3 and inter-CCE bundling for CORESET2 is performed through 2 and 3 or the corresponding CCE indexing is performed for each CORESET. However, when the candidate PDCCH is composed of CCEs belonging to several CORESETs, the overlaid CCEs may be indexed again and bundling may be performed for each CORESET.

In the case of intra-CCE REG bundling, if one CCE is composed of REGs belonging to several CORESETs, the following method is applicable to intra-CCE REG bundling.

If the REG bundling size is 6, it may be assumed that one CCE is not mapped to several CORESETs.

Meanwhile, the REG bundling size may be 6/k. k may be the number of CORESETs, to which one CCE is mapped. REGs having the same index among the bundled REGs may be grouped to configure one CCE. If the time-domain REG bundling size is used, since 6/k may not be satisfied, the time-domain REG bundling may not be assumed if the corresponding method is used.

Figure 29:
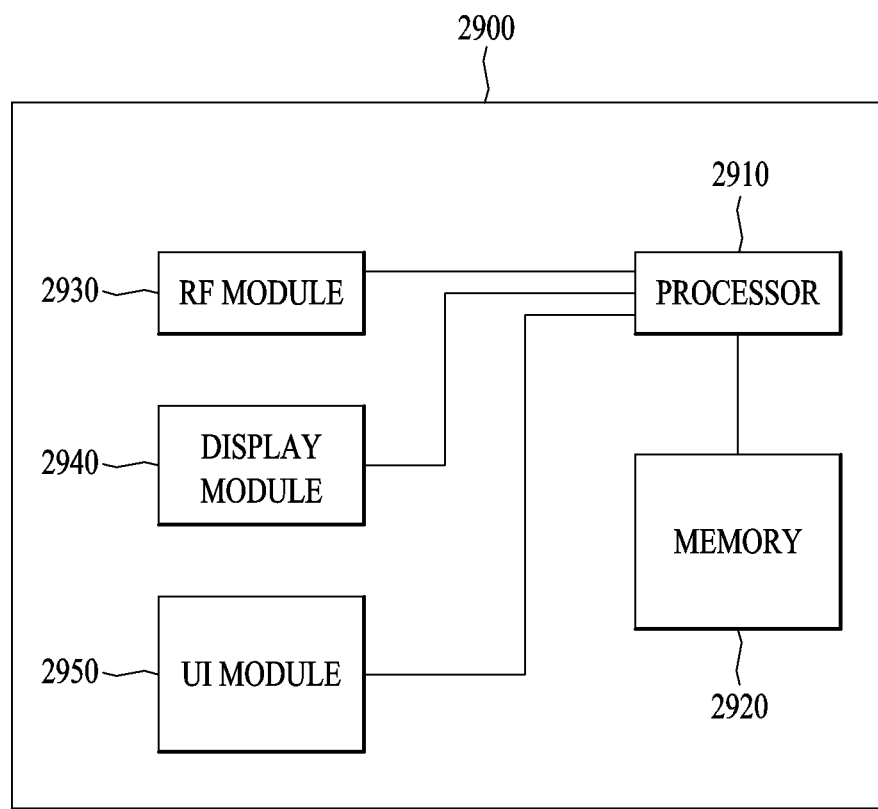
FIG. 29 is a block diagram of a communication apparatus according to an embodiment of the present disclosure.

Referring to FIG. 29, a communication apparatus 2900 includes a processor 2910, a memory 2920, an RF module 2930, a display module 2940, and a User Interface (UI) module 2950.

The communication device 2900 is shown as having the configuration illustrated in FIG. 29, for the convenience of description. Some modules may be added to or omitted from the communication apparatus 2900. In addition, a module of the communication apparatus 2900 may be divided into more modules. The processor 2910 is configured to perform operations according to the embodiments of the present disclosure described before with reference to the drawings. Specifically, for detailed operations of the processor 2910, the descriptions of FIGS. 1 to 28 may be referred to.

The memory 2920 is connected to the processor 2910 and stores an Operating System (OS), applications, program codes, data, etc. The RF module 2930, which is connected to the processor 2910, upconverts a baseband signal to an RF signal or downconverts an RF signal to a baseband signal. For this purpose, the RF module 2930 performs digital-to-analog conversion, amplification, filtering, and frequency upconversion or performs these processes reversely. The display module 2940 is connected to the processor 2910 and displays various types of information. The display module 2940 may be configured as, not limited to, a known component such as a Liquid Crystal Display (LCD), a Light Emitting Diode (LED) display, and an Organic Light Emitting Diode (OLED) display. The UI module 2950 is connected to the processor 2910 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

Although the example of applying the method and apparatus for transmitting the downlink control channel to the fifth-generation NewRAT system has been described, the present invention is applicable to various wireless communication systems in addition to the fifth-generation NewRAT system.

What is claimed is:

1. A method for transmitting a physical downlink control channel (PDCCH) by a base station (BS) in a wireless communication system, the method comprising:
    transmitting, to a user equipment (UE), (i) first information related to a resource element group (REG) bundle size and (ii) second information related to an interleaver size for interleaving REG bundles; and
    transmitting, based on the first information and the second information, the PDCCH over a control resource set (CORESET) that comprises a plurality of REGs that are bundled into a plurality of REG bundles based on the first information,
    wherein an interleaver is determined based on (i) the second information and (ii) a number of the plurality of REG bundles included in the CORESET,
    wherein the plurality of REG bundles are interleaved within the CORESET based on the interleaver, and
    wherein, based on a value of the second information being equal to a number of REG bundles included in a control channel element (CCE) of the CORESET, the REG bundles of the CCE are mapped to physical resources at a regular interval.

2. The method of claim 1, wherein a duration of the CORESET is configured to be 1, 2, or 3 Orthogonal Frequency Division Multiplexed (OFDM) symbols, and
    wherein the REG bundle size is related to the duration of the CORESET.

3. The method of claim 1, wherein the number of the plurality of REG bundles included in the CORESET is obtained by dividing a total number of the plurality of REGs included in the CORESET by the REG bundle size.

4. The method of claim 1,
    wherein, based on a number of REGs included in the CCE corresponding to a product of the value of the second information and a value of the first information, the REG bundles of the CCE are mapped to the physical resources at the regular interval.

5. A base station (BS) for transmitting a physical downlink control channel (PDCCH) in a wireless communication system, the BS comprising:
    at least one transceiver;
    at least one processor; and
    at least one computer memory operably connectable to the at least one processor and storing instructions that, when executed, cause the at least one processor to perform operations comprising:
    transmitting, to a user equipment (UE) through the at least one transceiver, (i) first information related to a resource element group (REG) bundle size and (ii) second information related to an interleaver size for interleaving REG bundles; and
    transmitting, based on the first information and the second information, the PDCCH over a control resource set (CORESET) that comprises a plurality of REGs that are bundled into a plurality of REG bundles based on the first information, through the at least one transceiver,
    wherein an interleaver is determined based on (i) the second information and (ii) a number of the plurality of REG bundles included in the CORESET,
    wherein the plurality of REG bundles are interleaved within the CORESET based on the interleaver, and
    wherein, based on a value of the second information being equal to a number of REG bundles included in a control channel element (CCE) of the CORESET, the REG bundles of the CCE are mapped to physical resources at a regular interval.

6. The BS of claim 5, wherein a duration of the CORESET is configured to be 1, 2, or 3 Orthogonal Frequency Division Multiplexed (OFDM) symbols, and
    wherein the REG bundle size is related to the duration of the CORESET.

7. The BS of claim 5, wherein the number of the plurality of REG bundles included in the CORESET is obtained by dividing a total number of the plurality of REGs included in the CORESET by the REG bundle size.

8. The BS of claim 5,
    wherein, based on the number of REGs included in the CCE corresponding to a product of the value of the second information and a value of the first information, the REG bundles of the CCE are mapped to the physical resources at the regular interval.

9. A non-transitory computer readable storage medium storing at least one computer program comprising instructions that, when executed by at least one processor, cause the at least one processor to perform operations for a base station (BS), the operations comprising:
    transmitting (i) first information related to a resource element group (REG) bundle size and (ii) second information related to an interleaver size for interleaving REG bundles; and
    transmitting, based on the first information and the second information, a physical downlink control channel (PDCCH) over a control resource set (CORESET) that comprises a plurality of REGs that are bundled into a plurality of REG bundles based on the first information,
    wherein an interleaver is determined based on (i) the second information and (ii) a number of the plurality of REG bundles included in the CORESET,
    wherein the plurality of REG bundles are interleaved within the CORESET based on the interleaver, and
    wherein, based on a value of the second information being equal to a number of REG bundles included in a control channel element (CCE) of the CORESET, the REG bundles of the CCE are mapped to physical resources at a regular interval.

* * * * *